(12) United States Patent
Kodama et al.

(10) Patent No.: US 11,087,428 B2
(45) Date of Patent: Aug. 10, 2021

(54) IMAGE PROCESSING APPARATUS, DATA PROCESSING APPARATUS, AND IMAGE PROCESSING METHOD

(71) Applicant: CANON KABUSHIKI KAISHA, Tokyo (JP)

(72) Inventors: Shigeo Kodama, Tokyo (JP); Kohei Kishi, Kawasaki (JP)

(73) Assignee: CANON KABUSHIKI KAISHA, Tokyo (JP)

(*) Notice: Subject to any disclaimer, the term of this patent is extended or adjusted under 35 U.S.C. 154(b) by 118 days.

(21) Appl. No.: 16/296,735

(22) Filed: Mar. 8, 2019

(65) Prior Publication Data
US 2019/0295209 A1 Sep. 26, 2019

(30) Foreign Application Priority Data

Mar. 23, 2018 (JP) .............................. JP2018-056750
Jan. 23, 2019 (JP) .............................. JP2019-009773

(51) Int. Cl.
*G06K 9/00* (2006.01)
*G06T 1/20* (2006.01)
*G06N 3/04* (2006.01)

(52) U.S. Cl.
CPC ................. *G06T 1/20* (2013.01); *G06N 3/04* (2013.01)

(58) Field of Classification Search
CPC .... G06T 1/20; G06T 1/60; G06T 5/20; G06T 7/00; G06N 3/04; G06K 9/56; H04N 5/14; H04N 5/335; H04N 3/155; H04N 2201/00869; G06F 15/8015; G06F 15/8023
See application file for complete search history.

(56) References Cited

U.S. PATENT DOCUMENTS

| | | | | |
|---|---|---|---|---|
| 4,816,993 A | * | 3/1989 | Takahashi | ......... G06F 15/17337 712/28 |
| 5,325,500 A | * | 6/1994 | Bell | .......................... G06F 9/38 711/157 |
| 5,408,613 A | * | 4/1995 | Okabayashi | ............ G06F 15/17 709/233 |
| 5,778,156 A | * | 7/1998 | Schweid | ................. G06T 7/143 382/176 |
| 6,009,242 A | * | 12/1999 | Anzai | ................... G06F 3/1295 358/1.13 |

(Continued)

FOREIGN PATENT DOCUMENTS

JP 2000125122 A 4/2000

*Primary Examiner* — Amir Alavi

(74) *Attorney, Agent, or Firm* — Carter, DeLuca & Farrell LLP

(57) ABSTRACT

There is provided with an image processing apparatus for performing image processing for an input image. Each of N processing modules refers to a processing result for a reference pixel different from a processing target pixel and generates a processing result for the processing target pixel. Each of the N processing modules generates a processing result for a first pixel included in the first pixel line and next generates a processing result for a second pixel. The second pixel is included in a second pixel line different from the first pixel line in the processing target region and becomes processable in accordance with the generation of the processing result for the first pixel.

15 Claims, 25 Drawing Sheets

(56) References Cited

U.S. PATENT DOCUMENTS

| | | | | |
|---|---|---|---|---|
| 6,181,829 B1* | 1/2001 | Clark | ............ | H04N 1/40062 |
| | | | | 382/224 |
| 6,185,336 B1* | 2/2001 | Clark | ............ | H04N 1/40062 |
| | | | | 358/1.9 |
| 6,324,562 B1* | 11/2001 | Inagaki | ............ | G06F 9/4843 |
| | | | | 718/100 |
| 8,428,126 B2* | 4/2013 | Tanaka | ............ | H04N 19/436 |
| | | | | 375/240.12 |
| 8,824,614 B2* | 9/2014 | Tokairin | ............ | G03G 21/14 |
| | | | | 375/371 |
| 9,485,388 B2 | 11/2016 | Kodama et al. | | |
| 2014/0298336 A1* | 10/2014 | Taniuchi | ............ | G06F 9/455 |
| | | | | 718/1 |
| 2019/0295209 A1* | 9/2019 | Kodama | ............ | G06T 1/20 |

* cited by examiner

FIG. 5
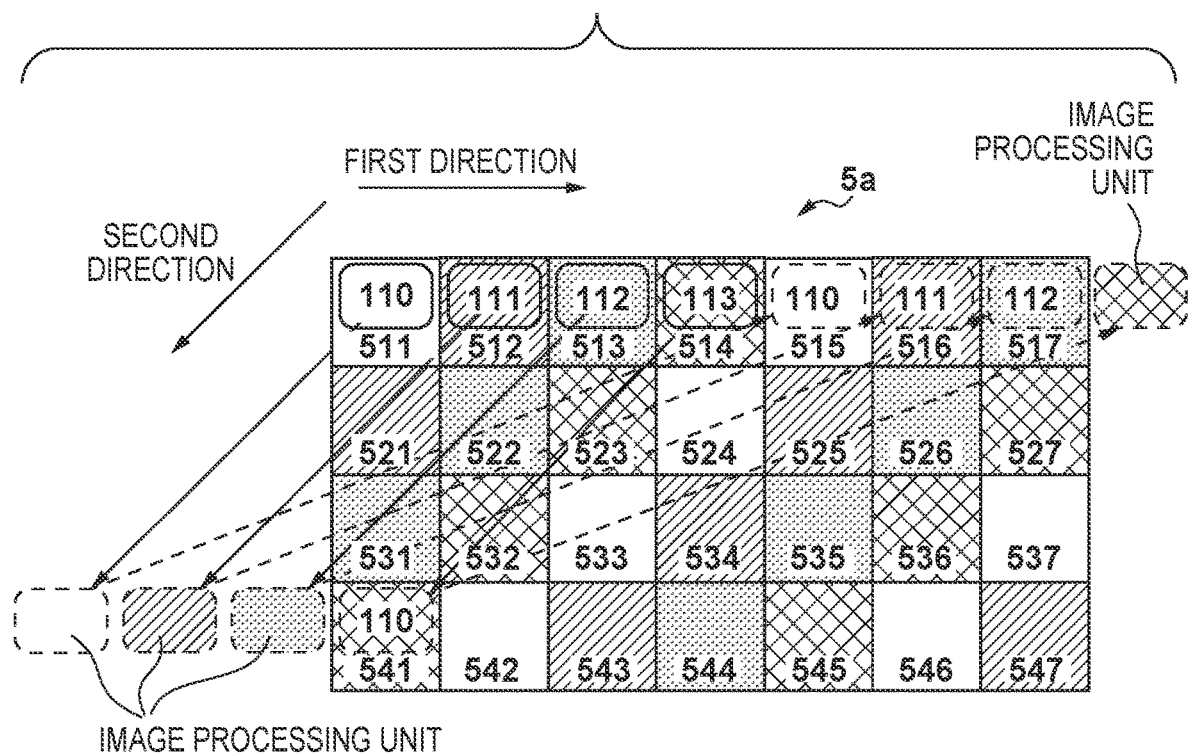
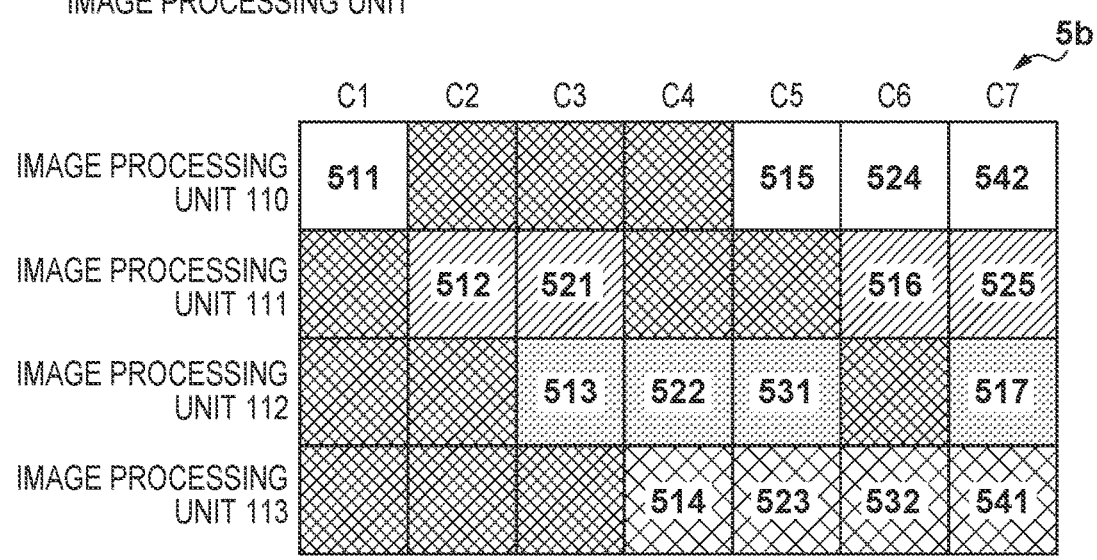
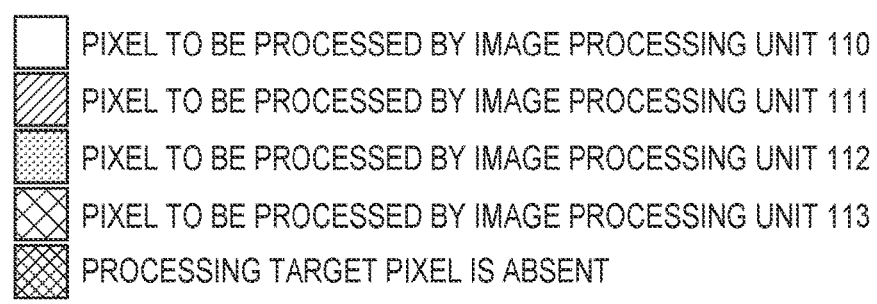

FIG. 6A
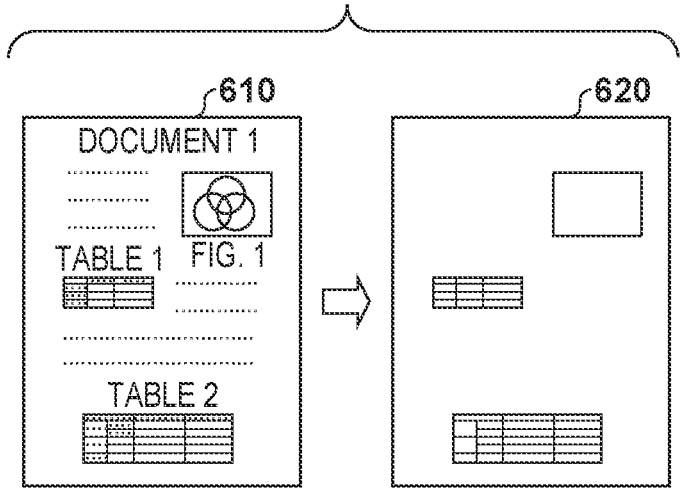
FIG. 6B
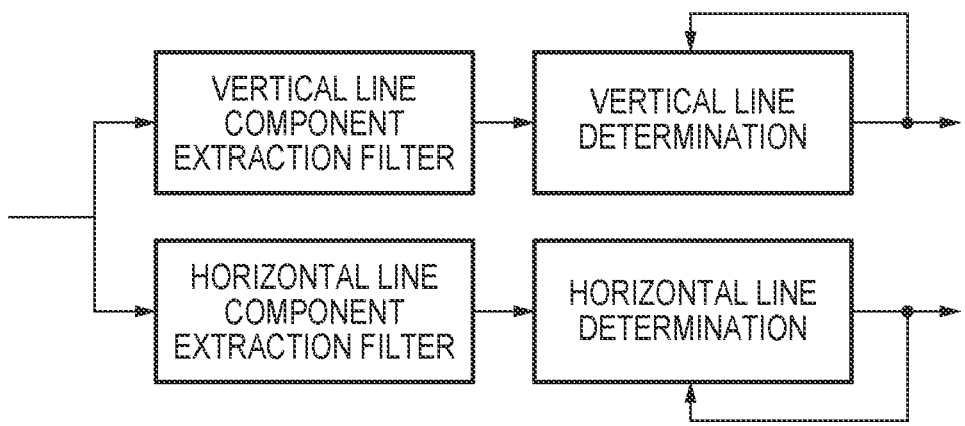
FIG. 6C  FIG. 6D  FIG. 6E
|   |   |   |
|---|---|---|
|   |   |   |
|   | * |   |
|   |   |   |
| -1 | 2 | -1 |
|---|---|---|
| -2 | 4 | -2 |
| -1 | 2 | -1 |
| -1 | -2 | -1 |
|---|---|---|
| -2 | 4 | -2 |
| -1 | -2 | -1 |

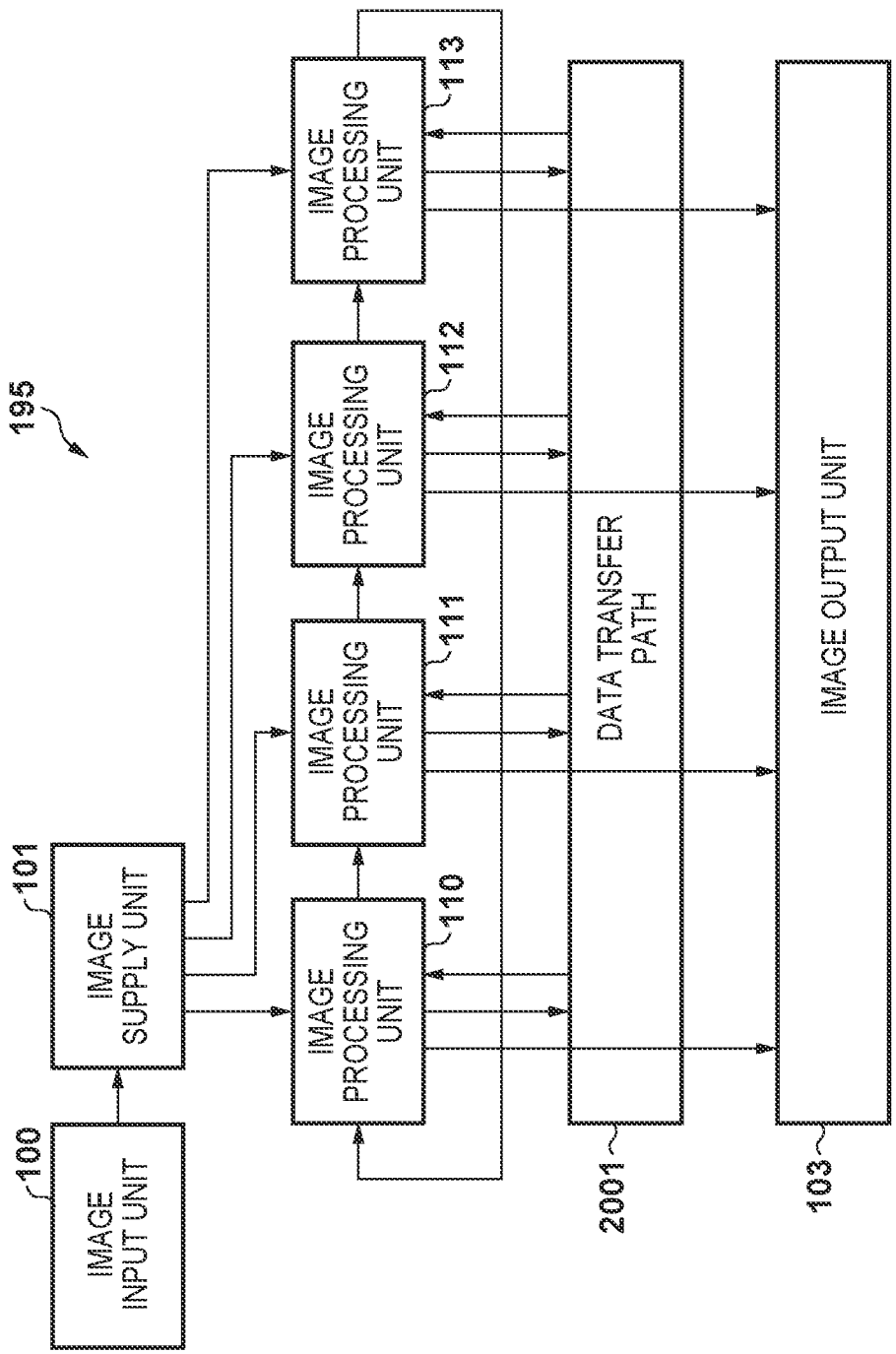

F I G. 20
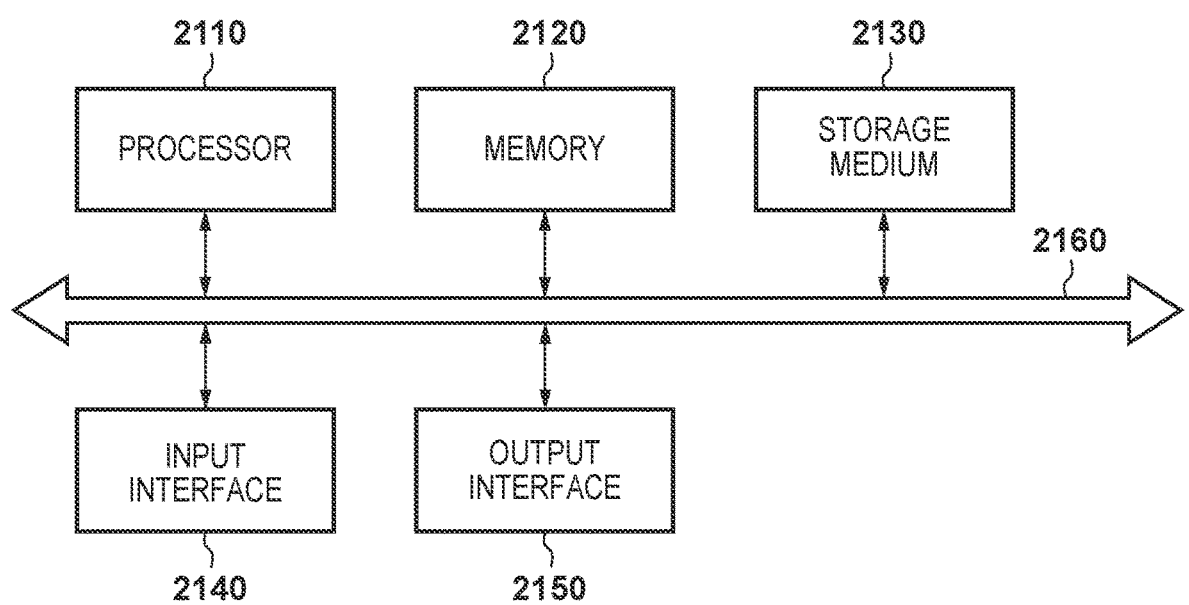

IMAGE PROCESSING APPARATUS, DATA PROCESSING APPARATUS, AND IMAGE PROCESSING METHOD

BACKGROUND OF THE INVENTION

Field of the Invention

The present invention relates to an image processing apparatus, a data processing apparatus, and an image processing method, and in particular to a data processing apparatus capable of parallelly executing data processing including a feedback loop.

Description of the Related Art

There is a demand for faster data processing in conjunction with an increase in the digital data amount of image data or the like. One of method for such speeding up data processing is parallel processing. Meanwhile, in some data processing, the result of processing data is used in the processing of subsequent data; that is, the processing has a feedback loop. In such processing, it is necessary to wait for propagation of information needed to process certain data. In addition, information of another propagation source is reflected in the information of the propagation source. Accordingly, there is a dependence between data. It is therefore difficult speed up processing by parallelization.

Japanese Patent Laid-Open No. 2000-125122 discloses a method of parallelizing error diffusion processing that is a kind of feedback processing. In the method of Japanese Patent Laid-Open No. 2000-125122, different calculation units are assigned to pixel lines, and one calculation unit sequentially processes pixels arranged in the X direction. The processing timing is shifted such that each calculation unit processes a pixel for which a diffused density error from another pixel is determined, thereby implementing parallelization.

SUMMARY OF THE INVENTION

According to an embodiment of the present invention, an image processing apparatus for performing image processing for an input image comprises: N processing modules each configured to refer to a processing result for a reference pixel different from a processing target pixel and generate a processing result for the processing target pixel, wherein the N processing modules parallelly generate processing results for processing target pixels different from each other, the N processing modules are connected to transfer the processing results, processing results for each of N continuous pixels included in a first pixel line of a processing target region in the input image are sequentially generated in a predetermined order by the different processing module, and each of the N processing modules is further configured to generate a processing result for a first pixel included in the first pixel line and next generate a processing result for a second pixel, wherein the second pixel is included in a second pixel line different from the first pixel line in the processing target region and becomes processable in accordance with the generation of the processing result for the first pixel.

According to another embodiment of the present invention, an image processing apparatus for performing image processing for an input image comprises: N processing modules each configured to refer to a processing result for a reference pixel different from a processing target pixel and generate a processing result for the processing target pixel, wherein the N processing modules parallelly generate processing results for processing target pixels different from each other, the N processing modules are connected to transfer the processing results, and each of the N processing modules acquires the processing result for the reference pixel from the same processing module regardless of the processing target pixel.

According to still another embodiment of the present invention, an image processing apparatus for performing image processing for an input image comprises: N processing modules each configured to refer to a processing result for a reference pixel different from a processing target pixel and generate a processing result for the processing target pixel, wherein the N processing modules parallelly generate processing results for processing target pixels different from each other, and the N processing modules are connected in a ring shape to transfer the processing results.

According to yet another embodiment of the present invention, an image processing method for performing image processing for an input image comprises: parallelly generating processing results for processing target pixels different from each other by N processing modules, wherein each of the N processing modules is configured to refer to a processing result for a reference pixel different from the processing target pixel and generate the processing result for the processing target pixel, and wherein the N processing modules are connected to transfer the processing results, wherein processing results for each of N continuous pixels included in a first pixel line of a processing target region in the input image are sequentially generated in a predetermined order by the different processing module, and each of the N processing modules generates a processing result for a first pixel included in the first pixel line and next generates a processing result for a second pixel, wherein the second pixel is included in a second pixel line different from the first pixel line in the processing target region and becomes processable in accordance with the generation of the processing result for the first pixel.

According to still yet another embodiment of the present invention, a data processing apparatus for performing processing for a sequentially input data group using a recurrent neural network comprises: a plurality of calculation units each configured to perform an operation corresponding to a hidden layer that forms the recurrent neural network, thereby repetitively generating an output result of the hidden layer and intermediate data to be recursively referred to, wherein one calculation unit of the plurality of calculation units is configured to perform the operation corresponding to the hidden layer while recursively referring to the intermediate data for the same hidden layer and transfer the output result of the hidden layer generated by the operation to a different calculation unit, so that the plurality of calculation units perform the processing for the data group using the recurrent neural network.

Further features of the present invention will become apparent from the following description of exemplary embodiments (with reference to the attached drawings).

BRIEF DESCRIPTION OF THE DRAWINGS

FIG. 5 is a view for explaining processing of a band area with four lines according to the first embodiment;

FIGS. 6A to 6H are views for explaining image processing according to the third embodiment;

FIG. 7 is a block diagram showing an example of the arrangement of an image processing apparatus according to the second embodiment;

FIG. 20 is a view showing the basic arrangement of a computer usable in each embodiment;

DESCRIPTION OF THE EMBODIMENTS

In image processing, a method of dividing an image into a plurality of divided data groups (band areas) and processing each band area sequentially from the left side is often used. On the other hand, the method of Japanese Patent Laid-Open No. 2000-125122 can process a band area whose height equals the number of calculation units. However, it is difficult to process a band area whose height is different from the number of calculation units. For example, in a case in which the number of pixel lines is larger than the number of calculation units, it is necessary to perform parallel processing while propagating errors for a pixel line to which no calculation unit is assigned. However, this is difficult.

According to an embodiment of the present invention, it is possible to parallelly perform data processing using the same processing module group for an arbitrary divided data group.

The embodiments of the present invention will now be described with reference to the accompanying drawings. However, the scope of the present invention is not limited to the following embodiments.

First Embodiment

An image processing apparatus according to the first embodiment performs image processing for an input image. The image processing apparatus according to this embodiment includes a plurality of image processing units (processing modules). In this embodiment, the image processing apparatus includes N image processing units. The N image processing units execute the same image processing for pixels of processing targets (to be referred to as processing target pixels hereinafter). Each image processing unit generates a processing result for a processing target pixel by referring to a processing result for a reference pixel different from the processing target pixel. A case in which the image processing apparatus performs error diffusion processing of converting a J-value image (i.e., an image where a pixel has one of J values) into an I-value image (I<J) will be described below. Error diffusion processing is one of processes using a feedback loop. That is, to obtain a processing result (quantization result) for a processing target pixel, it is necessary to refer to a processing result (a quantization error or a diffusing error) for a reference pixel. Additionally, the image processing apparatus according to this embodiment parallelly performs processing for a plurality of processing target pixels. That is, the plurality of image processing units parallelly generate processing results for processing target pixels different from each other. A pixel line or a line indicates a pixel train arranged in the main scanning direction and is also called a data train hereinafter.

Figure 1:
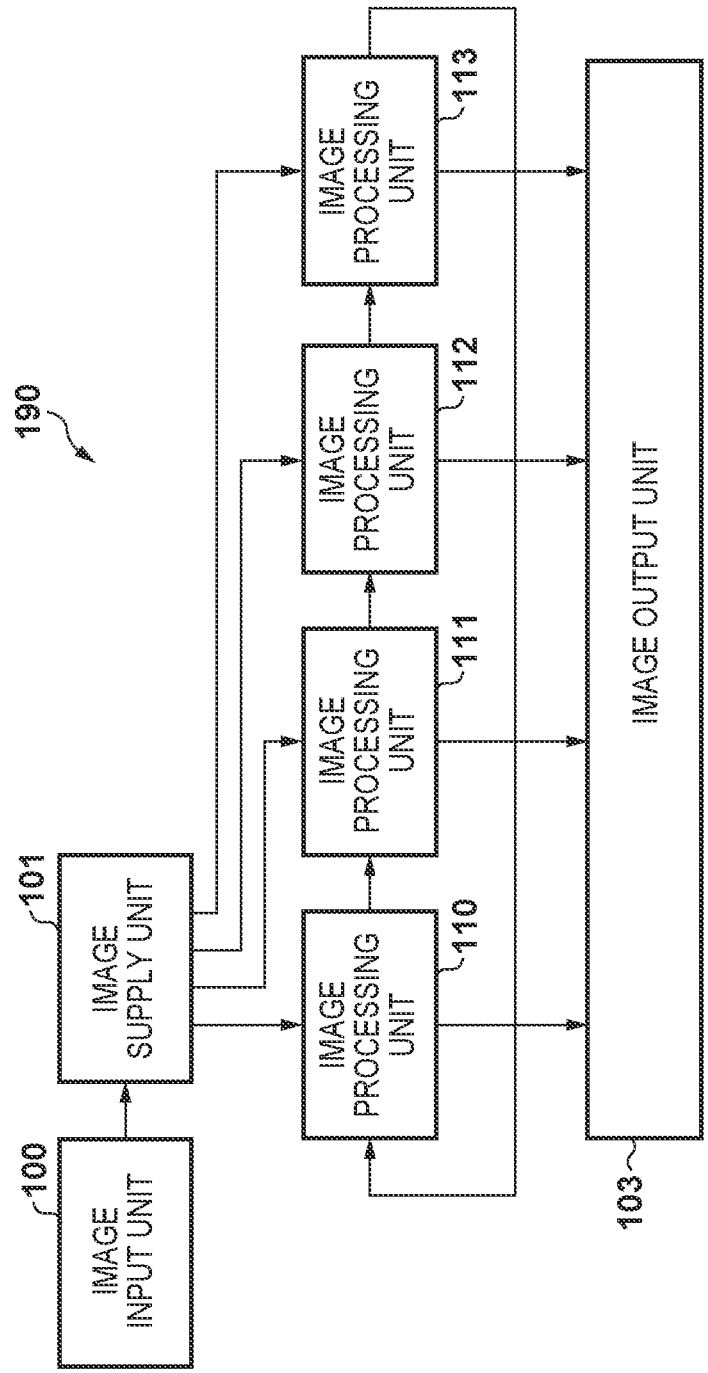
FIG. 1 is a block diagram showing an example of the arrangement of an image processing apparatus according to the first and third embodiments.

FIG. 1 is a block diagram showing an example of the functional arrangement of an image processing apparatus 190 according to the first embodiment. The image processing apparatus 190 includes an image input unit 100, an image supply unit 101, an image output unit 103, and image processing units 110 to 113.

The image input unit 100 acquires the data of an input image. In this embodiment, the data of an input image is the data of a J-value image. The image input unit 100 acquires the data of the input image from, for example, an image acquisition device such as a scanner or a digital camera or a recording medium such as a hard disk drive. Then, the image input unit 100 reads out the data of a processing target region in the input image and provides it to the image supply unit 101. In this embodiment, the input image is divided into a plurality of processing target regions, and processing is performed for each processing target region. Each processing target region will be referred to as a band area hereinafter.

The size of a band area is not particularly limited. In one embodiment, the input image is divided into rectangular regions each having a predetermined number of main-scanning-direction pixels and a predetermined number of sub-scanning-direction pixels. Here, the number of main-scanning-direction pixels of the band area can equal the number of main-scanning-direction pixels of the input image. Additionally, in one embodiment, the number of main-scanning-direction pixels of the band area is larger than the number of sub-scanning-direction pixels. In this embodiment, the main scanning direction is the horizontal direction, and the sub-scanning direction is the vertical direction.

The image supply unit 101 supplies pixel data necessary for processing of processing target pixels to the plurality of image processing units at timings to perform the processing. For example, the image supply unit 101 can supply the image data of a band area acquired from the image input unit 100 to the image processing units 110 to 113. At this time, the image supply unit 101 can supply the pixel data of J value of the band area to the image processing units 110 to 113 such that the image processing units 110 to 113 can perform parallel processing.

Each of the image processing units 110 to 113 performs the error diffusion processing for the pixel data of J value acquired from the image supply unit 101, thereby generating pixel data of I value. The plurality of image processing units are connected so as to transfer the processing result, as will be described later. The connection method between the plurality of image processing units is not particularly limited, and, for example, one image processing unit may be connected to all the remaining image processing units. On the other hand, as will be described later with reference to 13e in FIG. 13, connection may be absent between the image processing units that do not need transfer of processing results.

In this embodiment, the plurality of image processing units are connected in a ring shape. That is, in addition to connection between the image processing unit 110 and the image processing unit 111, connection between the image processing unit 111 and the image processing unit 112, and connection between the image processing unit 112 and the image processing unit 113, connection between the image processing unit 113 and the image processing unit 110 exists. In other words, there exists a connection path that starts from an image processing unit, passes through all the remaining image processing units once, and returns to the first image processing unit. In one embodiment, processing results for N continuous pixels included in the first pixel line of the processing target region in the input image are sequentially generated in a predetermined order by the image processing units that are different from each other, as will be described later. Here, when the image processing units connected in a ring shape in a predetermined order are used, propagation of a diffusing error in the first direction (main scanning direction) can easily be performed.

The image output unit 103 generates image data of I value using the pixel data acquired from the image processing units 110 to 113. The image output unit 103 records the pixel data processed by the image processing units 110 to 113 in a memory (for example, a DRAM) while eliminating processing delays between the lines, thereby outputting image data of I value to the memory.

Figure 3:
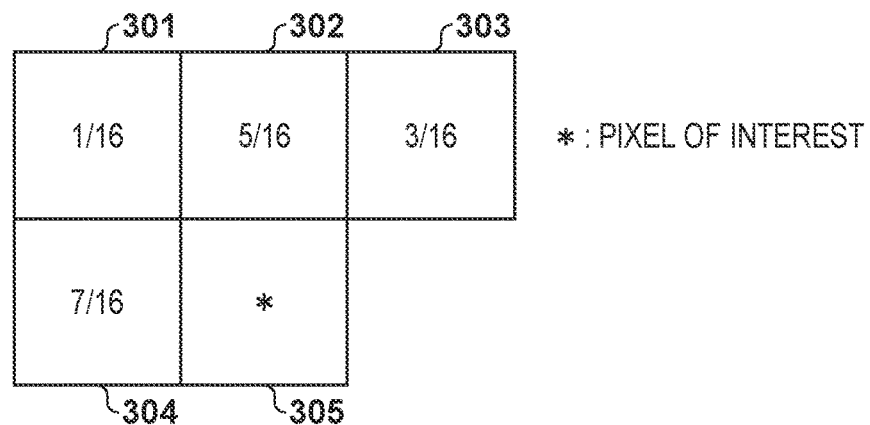
FIG. 3 is a view showing examples of reference pixels and diffusion coefficients in error diffusion processing.

Processing performed by the image processing apparatus 190 will be described below in detail. First, error diffusion processing will be described. Error diffusion processing is image processing of sequentially performing processing of diffusing the difference (quantization error) between the input tone value of a processing target pixel and a quantization representative value that is the quantization error of the processing target pixel to an unprocessed pixel in the neighborhood of the processing target pixel. FIG. 3 shows the relationship between a processing target pixel, reference pixels, and diffusion coefficients in one example of error diffusion processing.

In the error diffusion processing, a diffusing error calculated by multiplying a quantization error in a reference pixel by a diffusion coefficient is propagated to a processing target pixel. The diffusion coefficient is a weight according to the relative positions of the processing target pixel and the reference pixel. To perform the error diffusion processing, it is necessary to wait for propagation of the diffusing error of a processed pixel to a reference pixel. When processing is performed by referring to a processing result for another pixel, as in the error diffusion processing, the order of processing needs to be determined in consideration of the dependence between the pixels.

For example, when performing error diffusion processing shown in FIG. 3, to process a processing target pixel 305 and determine the pixel value, all the processes of pixels 301 to 304 that are reference pixels need to be completed. When the processing of the processing target pixel 305 is completed, the diffusing error is propagated to the next pixel to be processed using the processing target pixel 305 as a reference pixel. A pixel for which the diffusing errors from all the reference pixels are determined is processed next.

Figure 4:
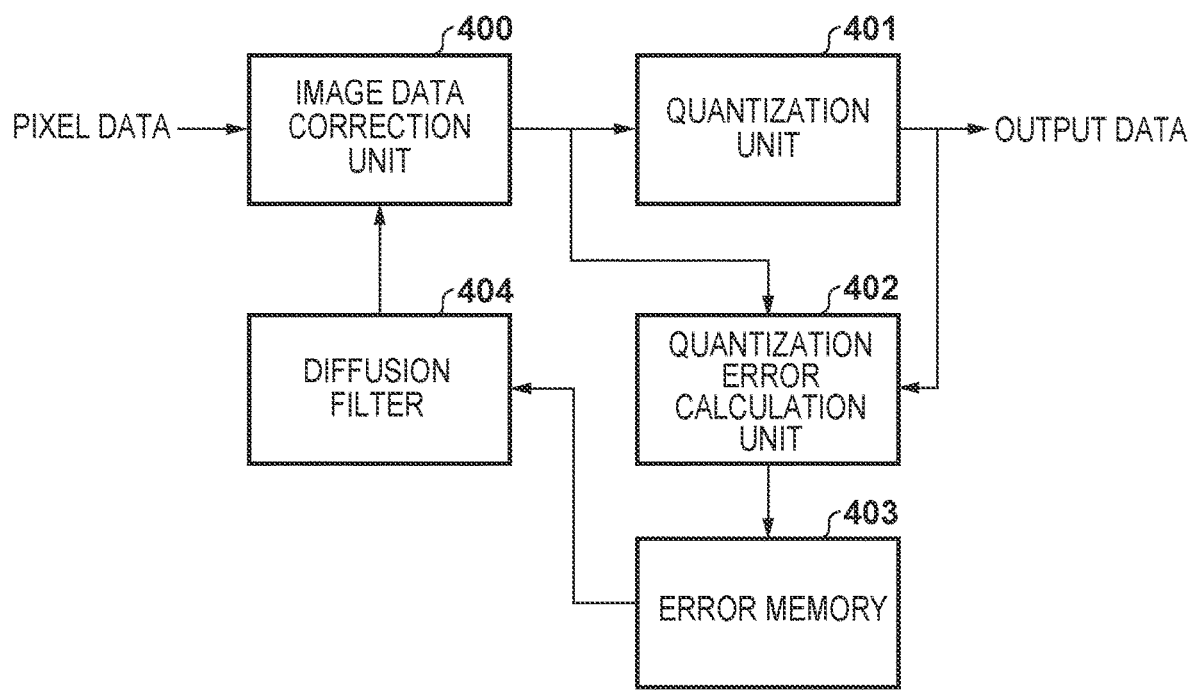
FIG. 4 is a block diagram showing an example of the arrangement of an image processing unit according to the first embodiment.

FIG. 4 is a block diagram showing the detailed arrangement of the image processing unit 110. The image processing units 111 to 113 can also have the same arrangement as the image processing unit 110. That is, the plurality of image processing units may have the same arrangement. The image processing unit 110 includes a correction unit 400, a quantization unit 401, an error calculation unit 402, an error memory 403, and a diffusion filter 404. As described above, each of the plurality of image processing units is formed as a processing module, and includes processing units (the correction unit 400, the quantization unit 401, the error calculation unit 402, and the diffusion filter 404) and a memory (the error memory 403). The physical arrangement of the image processing units 110 to 113 is not particularly limited. For example, the image processing unit 110 may include a circuit or a processing unit such as a processor configured to implement the functions of the correction unit 400, the quantization unit 401, the error calculation unit 402, and the diffusion filter 404 and a memory functioning as the error memory 403.

The correction unit 400 adds a cumulative value (correction value) of a diffusing error from a reference pixel to be described later to input pixel data of J value. The pixel data of J value may be pixel data represented by, for example, 8 bits (256 tones) per pixel.

The quantization unit 401 quantizes the pixel data of J value corrected by the correction unit 400 into pixel data of I value. For example, the quantization unit 401 quantizes the pixel data of J value into a binary tone value corresponding to a density value of 0 or a density value of 255. The error calculation unit 402 calculates the error between the pixel data of J value corrected by the correction unit 400 and the pixel data of I value quantized by the quantization unit 401.

The error memory 403 holds the quantization error calculated by the error calculation unit 402. The error memory 403 can also hold the quantization errors of the reference pixels transferred from the remaining image processing units 111 to 113. The quantization error calculated by the error calculation unit 402 can also be transferred from the error memory 403 to the remaining image processing units 111 to 113. The diffusion filter 404 calculates a diffusing error by multiplying the quantization error of the reference pixel sent from the error calculation unit 402 or the error memory 403 by a diffusion coefficient. In addition, the diffusion filter 404 calculates the cumulative value of the diffusing errors for the processing target pixel and outputs the cumulative value to the correction unit 400.

As described above, the image processing unit 110 can quantize the input pixel data of J value using the pixel data of J value and the diffusing errors of the reference pixels, calculate the diffusing error from the quantization error, and propagates the diffusing error. Not that the error memory 403 may hold the diffusing error of each reference pixel in place of the quantization error of each reference pixel.

The arrangement of the image processing units 110 to 113 is not limited to the above-described arrangement. It is possible to use a processing unit having an arbitrary arrangement capable of receiving the quantization error or diffusing error from each reference pixel, quantizing the pixel value of the processing target pixel to calculate the quantization error, and transferring the quantization error or the diffusing error.

(Example of Processing for Band Area with Four Lines)

Error diffusion processing for a band area with four lines read from an input image by the image input unit 100 will be described below as a detailed example of processing. In this processing example, parallel processing with four parallel processes is performed using the four image processing units 110 to 113. In addition, for pixels that continue in the first direction as many as the number of parallel processes, different image processing units 110 to 113 perform processing (quantization processing). On the other hand, for a processable pixel that appears in the second direction as a result of processing performed for the processing target pixel by an image processing unit, the same image processing unit performs processing. One image processing unit repeats processing of a pixel located in the second direction. When processing of a pixel in the final data train (in this example, the fourth data train included in the band area) is performed, this image processing unit performs processing of a processable pixel existing in the first data train (in this example, the first data train included in the band area). The first direction is the main scanning direction in the following description. Additionally, the second direction can be defined in accordance with the positions of reference pixels.

The processing order will be described with reference to 5a in FIG. 5. In the following processing example, pixels adjacent to the processing target pixel on the upper left, upper, upper right, and left sides are used as the reference pixels, as shown in FIG. 3. Hence, a processable pixel is a pixel for which the pixels adjacent on the upper left, upper, upper right, and left sides have undergone the processing (that is, the quantization values and the quantization errors are calculated). As described above, in one embodiment, a reference pixel is located on the pixel line on the upper side of the processing target pixel or located on the left side of the processing target pixel on the same pixel line as the processing target pixel.

In a cycle C1, the processable pixel is only a pixel 511 at the processing start position. Hence, the image processing unit 110 processes the pixel 511 at the processing start position. Then, a pixel 512 for which processing of all the reference pixels is completed becomes a processable pixel. Here, the pixel 512 is located in the first direction (main scanning direction) from the processed pixel 511. Since the pixels 511 and 512 continue in the first direction, an image processing unit different from the image processing unit 110 that has processed the pixel 511, for example, the image processing unit 111 next to the image processing unit 110 processes the pixel 512 in a cycle C2. Note that the error reference range of the pixel 512 includes a region where no pixel exists. Here, this region is handled assuming that a processed pixel exists in this region, and a diffusing error from this pixel is absent. However, for example, if a diffusing error from another band is propagated, processing may be performed in consideration of this diffusing error.

In the cycle C2, the pixel 512 is processed by the image processing unit 111, and as a result, pixels 513 and 521 change to processable pixels. The pixel 513 is located in the first direction from the processed pixel 512. Since the pixels 511 to 513 continue in the first direction, an image processing unit different from the image processing units 110 and 111 that have processed these pixels, for example, the image processing unit 112 next to the image processing unit 111 processes the pixel 513 in a cycle C3.

On the other hand, the pixel 521 is located in the second direction different from the first direction from the processed pixel 512. For this reason, the pixel 521 is processed in the cycle C3 by the image processing unit 111 that has completed the processing of the reference pixel for the pixel 521 in the cycle C2. In this way, in this processing example, the second direction is determined to be the direction from the pixel 512 to the pixel 521, that is, the direction advancing downward by one line and leftward by one pixel. In the subsequent processing cycles, the image processing unit 111 sequentially processes pixels in four data trains in the second direction. That is, the image processing unit 111 processes a pixel located at a predetermined relative position (in this example, a position advancing downward by one line and leftward by one pixel) from the pixel processed in the preceding cycle. Since there are no pixels at a position one pixel away leftward from a pixel 531 and at a position two pixels away leftward from a pixel 541, the image processing unit 111 waits at the processing timings of these pixels.

The image processing unit that has processed the pixels in the four data trains processes a processable pixel in the first data train next, and further repeats sequentially processing pixels in the four data trains in the second direction. In FIG. 5, 5b shows pixels to be processed by the image processing units 110 to 113 in the cycles C1 to C7 in this arrangement. In the cycles C1 to C6, each image processing unit sometimes does not perform processing because a processing target pixel as the target of the processing does not exist. In this case, the image processing unit may not propagate an error. From the cycle C7, each image processing unit has a processing target pixel as the target of the processing, and four pixels simultaneously become the processing target pixels.

According to the arrangement of this embodiment, the pixels as the targets of simultaneous parallel processing by the plurality of image processing units do not exist on the same line. In addition, a plurality of pixels that appear as the result of simultaneously processing a plurality of pixels do not exist on the same line because they are located at predetermined relative positions in the second direction from the plurality of pixels. The processable pixels that simultaneously appear exist in different height directions because of the dependence shown in the reference range. Additionally, when the reference range shown in FIG. 3 is used, the processable pixels that simultaneously appear are located at different positions in the horizontal direction and also located at different positions in the oblique direction (the direction advancing downward by one line and leftward by one pixel). This is because each image processing unit performs periodical scanning in the second direction to process a plurality of pixels whose positions in the vertical direction, in the horizontal direction, and in the oblique direction are different from each other and then process a processable pixel that appears at a predetermined relative position in the second direction. Because of this arrangement, the plurality of image processing units 110 to 113 can simultaneously process one pixel each.

In addition, after the (for example, M) pixels existing in the (for example, M) data trains are processed in the second direction, the processing unit processes the processable pixel existing in the first data train next. By such scanning, the plurality of different image processing units 110 to 113 that are sequentially arranged correspond to the plurality of pixels that continue in the first direction, respectively, and perform processing of corresponding pixels. Hence, loop processing is performed in which a pixel continuing in the first direction from the pixel processed by the final image processing unit 113 is processed by the first image processing unit 110. With this arrangement, even if the length of one data train changes, or even if the number of data trains included in the band area changes, the dependence of the image processing units that perform the processing does not change. That is, when one image processing unit performs processing of one pixel, the image processing unit that has processed the reference pixel for this pixel is already determined. For this reason, this pixel can be processed by acquiring a quantization error or a diffusing error from the connected specific image processing unit. As described above, since the connection relationship between the image processing units is not switched during the processing, parallel processing can be performed using the same arrangement.

Figure 2:
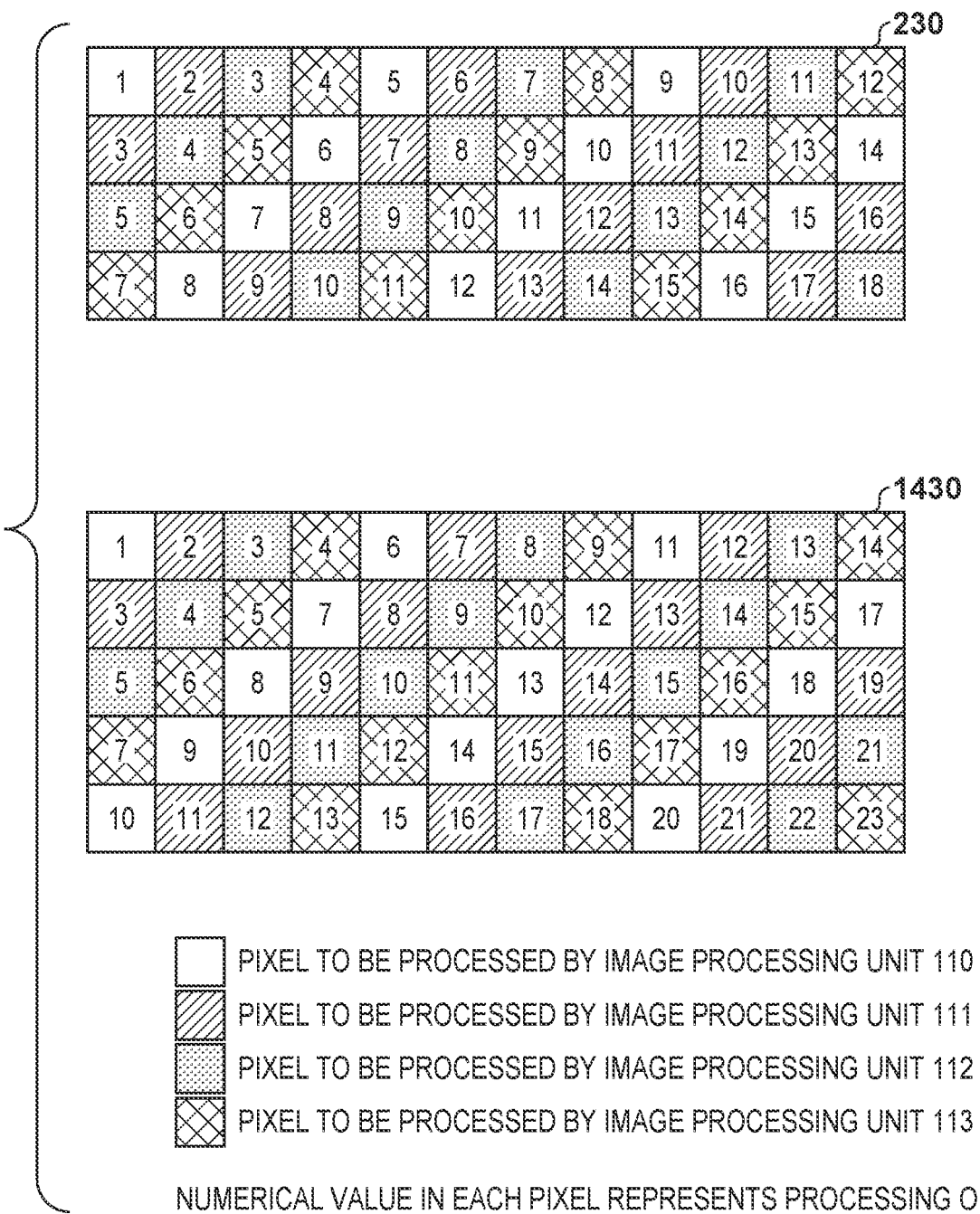
FIG. 2 is a view showing a band area with four lines and a band area with five lines according to the first embodiment.

A method of supplying pixel data to the image processing units 110 to 113 by the image supply unit 101 will be described next. FIG. 2 shows band areas 230 and 1430 that are the targets of processing. In the band areas 230 and 1430, the processing cycles to process processing target pixels are indicated by numerical values. In addition, the image processing units that are the pixel data supply destinations are shown as background patterns.

Figure 8:
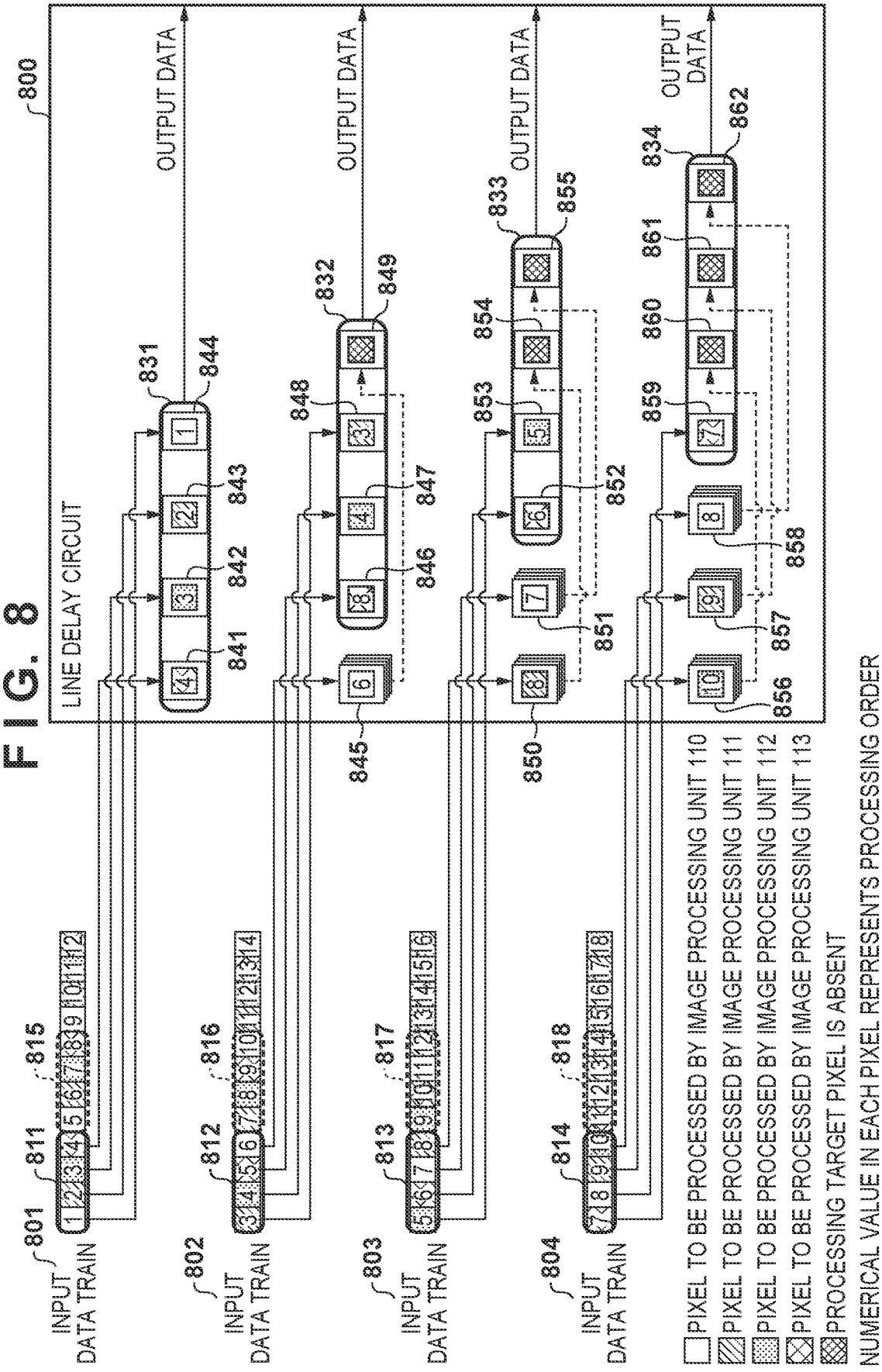
FIG. 8 is a view for explaining the arrangement of a line delay circuit according to the first embodiment.

The image supply unit 101 includes a line delay circuit 800 and a module delay circuit 900. The line delay circuit 800 will be described first with reference to FIG. 8. In this processing example, the line delay circuit 800 includes buffers 841 to 862. Input data trains 801 to 804 are included in the band area 230. The line delay circuit 800 sequentially acquires pixel data of a predetermined number of pixels from the input data trains 801 to 804. In this processing example, the line delay circuit 800 acquires pixel data of four pixels in one cycle. Here, the number of pixels corresponding to the pixel data acquired in one cycle is the same as the number of parallel processes and is four. That is, the line delay circuit 800 repeats processing of sequentially acquiring pixel data of four pixels from each of the input data trains 801 to 804 and further sequentially acquiring unacquired pixel data of four pixels from each of the input data trains 801 to 804.

The image supply unit 101 then transfers the acquired pixel data to the module delay circuit 900. Here, the line delay circuit 800 adds a line delay such that a delay corresponding to one pixel is added to the data train adjacent on the lower side as compared to the upper data train, and then transfers the pixel data to the module delay circuit 900. That is, in a given cycle, pixel data of a predetermined number of pixels continuing rightward from the first horizontal position of the upper line are output from the line delay circuit 800. In the next cycle, pixel data of a predetermined number of pixels which continue rightward from the second horizontal position of the adjacent lower line, which is located on the left side of the first horizontal position, are output from the line delay circuit 800. Thus transferring pixel data of an adjacent line such that the second horizontal position is located on the left side of the first horizontal position will be referred to as adding a line delay here.

A detailed example of the processing will be described below. No line delay is inserted into the first input data train 801. In a cycle C0, the line delay circuit 800 acquires pixel data 811 of four pixels from the input data train 801 and stores the pixel data in the buffers 841 to 844. Here, the pixel data of the pixels included in the acquired pixel data 811 are stored in descending order such that the pixel data of a pixel on the left side is stored in a front buffer. For example, of the pixel data 811, the pixel data of the leftmost pixel is stored in the buffer 844, and the pixel data of the rightmost pixel is stored in the buffer 841. A shift operation is performed for the data included in the buffers in the line delay circuit 800, as will be described later. A buffer located in the shift direction will be referred to as a front buffer here. In the cycle C1, the pixel data of the four pixels stored in the buffers 841 to 844 are output as pixel data 831 to the module delay circuit 900.

Processing of the input data train 802 will be described next. A line delay corresponding to one pixel with respect to the input data train 801 is inserted into the input data train 802. In the cycle C1, the line delay circuit 800 acquires pixel data 812 of four pixels from the input data train 802 and stores the pixel data in the buffers 845 to 848 in descending order. In the cycle C2, the pixel data of the four pixels stored in the buffers 846 to 849 are output as pixel data 832 to the module delay circuit 900. The buffer 845 is formed by buffers of four stages. The buffer 845 holds the stored pixel data until before the cycle C5 in which next pixel data 816 are acquired. Then, when the pixel data 816 of the next four pixels are stored in the buffers 845 to 848 in the cycle C5, the pixel data in the buffer 845 is stored in the buffer 849. In other words, the pixel data in the buffer 845 is shifted to the buffer 849. In the next cycle C6, the pixel data of the four pixels stored in the buffers 846 to 849 are output as the pixel data 832 to the module delay circuit 900.

Processing of the input data train 803 is the same as the processing of the input data train 802 except that a line delay corresponding to one pixel with respect to the input data train 802 is inserted into the input data train 803. That is, in the cycle C2, the line delay circuit 800 acquires pixel data 813 from the input data train 803 and stores the pixel data in the buffers 850 to 853. In the cycle C3, pixel data 833 stored in the buffers 852 to 855 are output to the module delay circuit 900. Additionally, when pixel data 817 are stored in the buffers 850 to 853 in the cycle C6, the pixel data in the buffers 850 and 851 are shifted to the buffers 854 and 855 and stored. In the cycle C7, the pixel data 833 are similarly output to the module delay circuit 900.

Processing of the input data train 804 is the same as the processing of the input data train 803 except that a line delay corresponding to one pixel with respect to the input data train 803 is inserted into the input data train 804. That is, in the cycle C3, pixel data 814 from the input data train 804 are stored in the buffers 856 to 859. In the cycle C4, pixel data 834 stored in the buffers 859 to 862 are output to the module delay circuit 900. When pixel data 818 are stored in the buffers 856 to 859 in the cycle C7, the pixel data in the buffers 856 to 858 are shifted to the buffers 860 and 862 and stored. In the cycle C8, the pixel data 834 are output to the module delay circuit 900.

In this processing example, the line delay is one pixel per line. This reflects the relative positions of the first pixel and the second pixel in the second direction. That is, one image processing unit sequentially processes the first pixel of the first pixel line and the second pixel of the second pixel line located on the lower side of the first pixel line. Here, since the column position of the second pixel is located one pixel away leftward from the first pixel, a line delay corresponding to one pixel is inserted into the input data train from the second pixel line such that the second pixel data is processed in the cycle next to the cycle in which the first pixel data is processed. On the other hand, depending on the contents of the image processing to be performed, the line delay may be increased to relax the timing restriction. On the other hand, when the line delay is increased, the period (number of cycles) to hold the processing result (for example, a quantization error or a diffusing error) of a reference pixel becomes long. This may lead to an increase in the number of error buffers necessary in the circuit.

Figure 9:
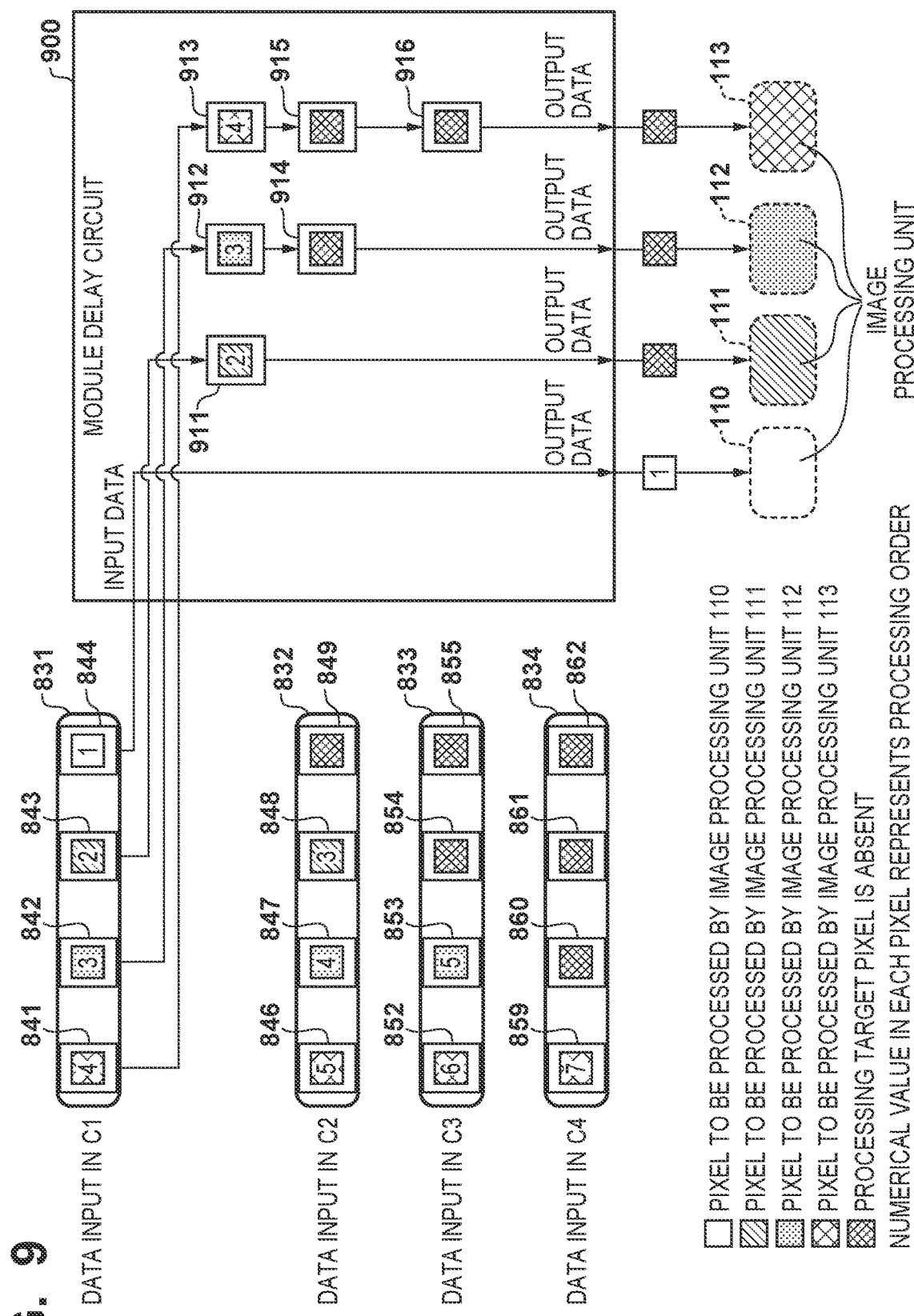
FIG. 9 is a view for explaining the arrangement of a module delay circuit according to the first and second embodiments.

The module delay circuit 900 will be described next with reference to FIG. 9. As is apparent from the above explanation, the pixel data of four pixels continuing in the first direction are input to the module delay circuit 900 in one cycle. The module delay circuit 900 transfers the pixel data of the four pixels to the image processing units 110 to 113, respectively. At this time, as the image processing units 110 to 113 sequentially perform the processing, the module delay circuit 900 performs the transfer while adding a module delay. In this processing example, the module delay is one cycle. That is, when the pixel data of four pixels are input, the module delay circuit 900 transfers the first pixel data to the image processing unit 110 in the same cycle, and transfers the second pixel data to the image processing unit 111 in the next cycle. In addition, the module delay circuit 900 transfers the third pixel data to the image processing unit 112 in the following cycle, and transfers the fourth pixel data to the image processing unit 113 in the next cycle. To add the module delay in this way, the module delay circuit 900 includes buffers 911 to 916.

Processing of the module delay circuit 900 will be described in more detail. In the cycle C1, the pixel data 831 of the four pixels are input from the line delay circuit 800. The pixel data stored in the buffers 841 to 843 are stored in the buffers 913 to 911, respectively. The buffers 911 to 913 store the pixel data to be transferred to the image processing units 111 to 113, respectively. The pixel data of a pixel on the left side is thus transferred to an image processing unit on the rear side. In addition, the pixel data stored in the buffer 844 is not stored in a buffer in the module delay circuit 900 but output to the image processing unit 110 in the cycle C1.

In the cycle C2, similarly, the pixel data 832 of the four pixels are input from the line delay circuit 800. The pixel data stored in the buffers 846 to 848 are stored in the buffers 913 to 911, respectively. The pixel data stored in the buffer 849 is not stored in a buffer in the module delay circuit 900 but output to the image processing unit 110 in the cycle C2. The pixel data stored in the buffer 911 is output to the image processing unit 111. In addition, the pixel data stored in the buffers 912 and 913 are stored in the buffers 914 and 915, respectively.

In the cycle C3 as well, the pixel data 833 are input from the line delay circuit 800. The pixel data stored in the buffer 855 is output to the image processing unit 110, and the pixel data stored in the buffers 852 to 854 are stored in the buffers 913 to 911. The pixel data stored in the buffers 911 and 914 are output to the image processing units 111 and 112, respectively. The pixel data stored in the buffers 912, 913, and 915 are transferred to the buffers 914, 915, and 916, respectively.

In the cycle C4 as well, the pixel data 834 are input from the line delay circuit 800. The pixel data stored in the buffer 862 is output to the image processing unit 110, and the pixel data stored in the buffers 859 to 861 are stored in the buffers 913 to 911. The pixel data stored in the buffers 911, 914, and 916 are output to the image processing units 111, 112, and 113, respectively. The pixel data stored in the buffers 912, 913, and 915 are transferred to the buffers 914, 915, and 916, respectively.

The same operation as described above is performed from the cycle C5 as well. In this way, the image supply unit 101 supplies the pixel data of pixels that continue in the first direction as many as the number of parallel processes to the image processing units 110 to 113 in every other cycle. With this operation, the image supply unit 101 can supply the pixel data in the band area 230 to the image processing units 110 to 113 as shown in FIG. 2 in a predetermined order.

The image output unit 103 eliminates the line delay and the module delay of the pixel data obtained by the processing of the image processing units 110 to 113 and outputs the pixel data to a memory (a DRAM or the like). The image output unit 103 gives a delay to the output timing of the pixel data so as to eliminate the line delay and the module delay given by the image supply unit 101. The following arrangement is merely an example, and any arrangement can be used to eliminate the delay.

The image output unit 103 includes a module delay elimination circuit 1000 and a line delay elimination circuit 1100. The module delay elimination circuit 1000 will be described with reference to 10a in FIG. 10. The module delay elimination circuit 1000 adds a delay to each of the pixel data of the pixels continuing in the first direction as many as the number of parallel processes. The delay difference added when the module delay circuit 900 supplies the pixel data to the image processing units 110 to 113 is thus eliminated. As a result, the pixel data of the pixels continuing in the first direction as many as the number of parallel processes are transferred from the module delay elimination circuit 1000 to the line delay elimination circuit 1100 at the same timing. For this operation, the module delay elimination circuit 1000 includes buffers 1011 to 1016, as shown in 10a. Of the pixel data of the pixels continuing in the first direction as many as the number of parallel processes, pixel data processed in a preceding cycle is held for a period longer by one cycle than that for pixel data processed in the following cycle and then output.

The pixel data of four pixels are input to the module delay elimination circuit 1000 in one cycle. That is, the pixel data of one pixel is input from each of the image processing units 110 to 113. The pixel data input from the image processing unit 110 to the buffer 1011 is output to the line delay elimination circuit 1100 after three cycles via the buffers 1014 and 1016. Similarly, the pixel data input from the image processing unit 111 to the buffer 1012 is output to the line delay elimination circuit 1100 after two cycles via the buffer 1015. The pixel data input from the image processing unit 112 to the buffer 1013 is output to the line delay elimination circuit 1100 after one cycle. The pixel data input from the image processing unit 113 to the module delay elimination circuit 1000 is output to the line delay elimination circuit 1100 without any delay.

Figure 10:
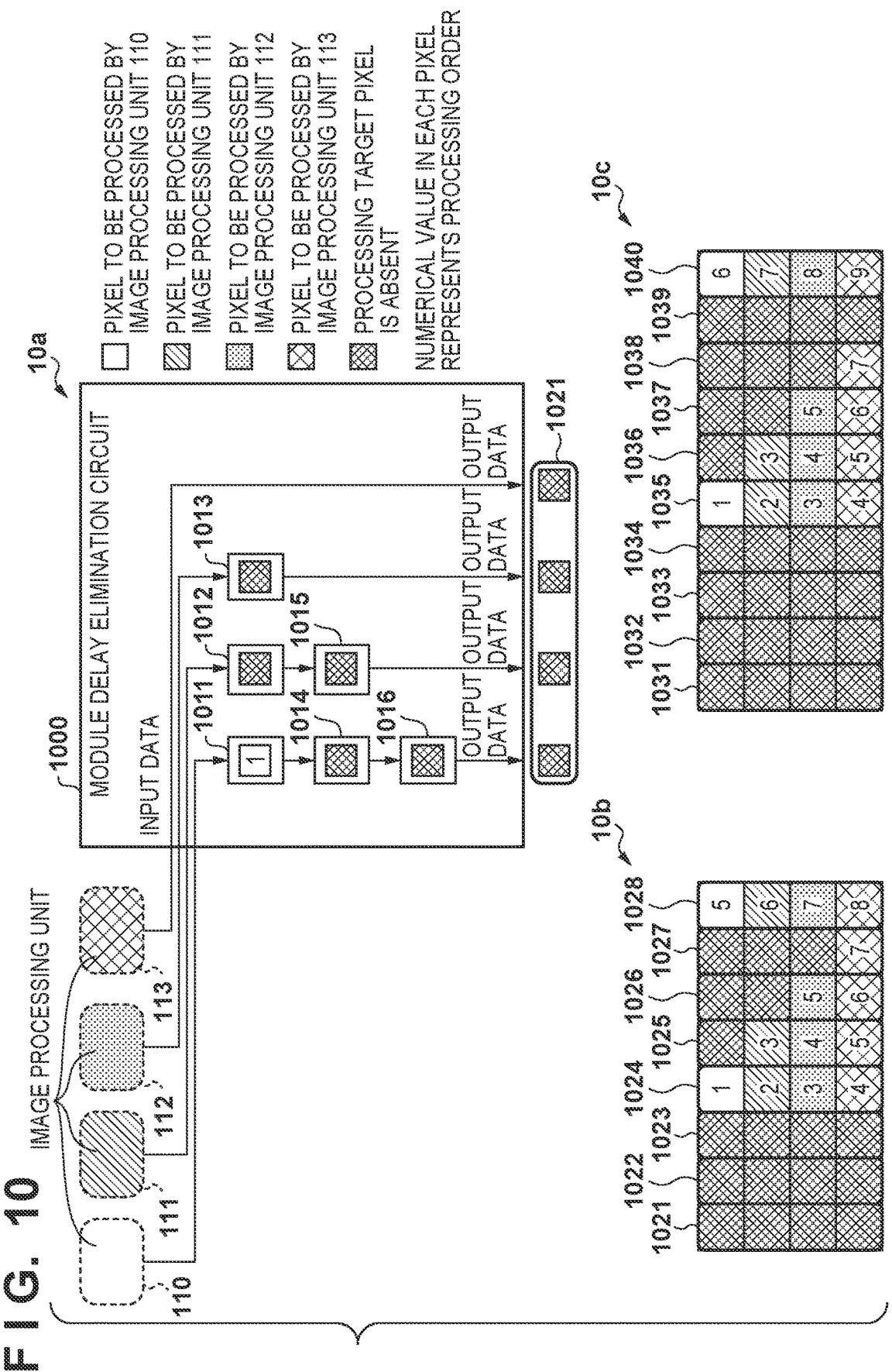
FIG. 10 is a view for explaining the arrangement of a module delay elimination circuit according to the first and second embodiments.

In FIG. 10, 10b shows pixel data 1021 to 1028 output from the module delay elimination circuit 1000 to the line delay elimination circuit 1100 in the cycles C1 to C8. After the pixel data 831 of the four pixels transferred to the module delay circuit 900 in the cycle C1 are processed, the delay difference is thus eliminated in the cycle C4, and the pixel data are output as the pixel data 1024 from the module delay elimination circuit 1000. Each of the pixel data 1021 to 1023 represents a delay corresponding to three cycles added by the module delay circuit 900 and the module delay elimination circuit 1000. Processing by the line delay elimination circuit 1100 for these is unnecessary.

Figure 11:
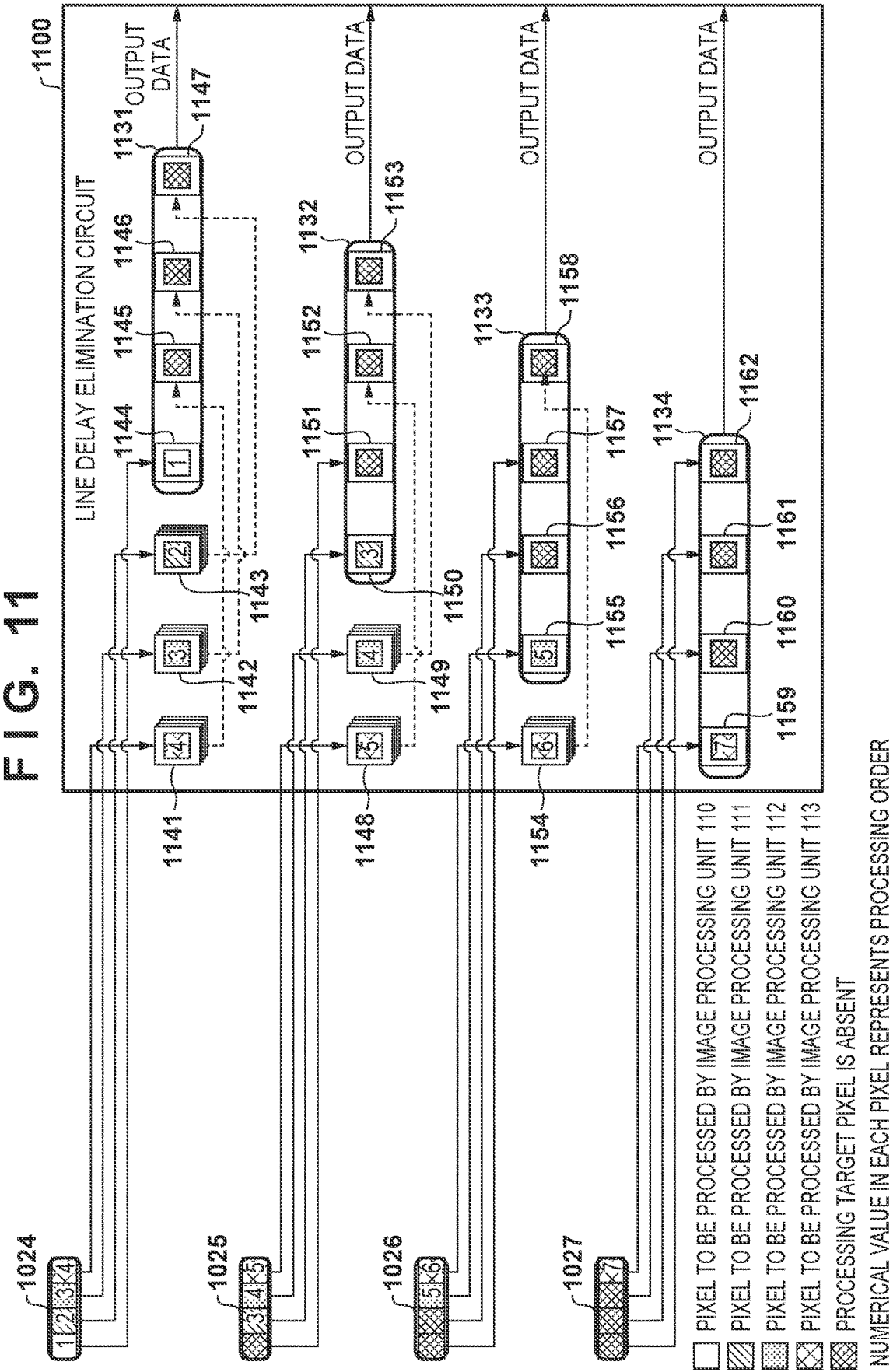
FIG. 11 is a view for explaining the arrangement of a line delay elimination circuit according to the first embodiment.

The line delay elimination circuit 1100 will be described with reference to FIG. 11. The line delay elimination circuit 1100 eliminates the line delay difference between the pixel data input from the module delay elimination circuit 1000. That is, the line delay elimination circuit 1100 adds a line delay such that a delay corresponding to one pixel is added to the data train adjacent on the upper side as compared to the lower data train, and then outputs the pixel data. A detailed arrangement for this can be the same as that of the line delay circuit 800.

That is, the line delay elimination circuit 1100 includes buffers 1141 to 1162. The pixel data of four pixels are input from the module delay elimination circuit 1000 to the line delay elimination circuit 1100 in one cycle, as shown in 10b. The pixel data 1024 are input to the buffers 1144 to 1141 in descending order. For example, of the pixel data 1024, the pixel data of the leftmost pixel is stored in the buffer 1144, and the pixel data of the rightmost pixel is stored in the buffer 1141. After a line delay corresponding to three pixels is added to the input pixel data, the pixel data are output to a memory (a DRAM or the like). That is, the pixel data input to the buffer 1144 is output in the next cycle. In addition, the pixel data input to the buffers 1143 to 1141 are shifted to the buffers 1147 to 1145 four cycles after the input and output five cycles after the input.

Similarly, the pixel data 1025 are input to the buffers 1151 to 1148 in descending order. After a line delay corresponding to two pixels is added, the pixel data are output to the memory. The pixel data 1026 are input to the buffers 1157 to 1154 in descending order. After a line delay corresponding to one pixel is added, the pixel data are output to the memory. The pixel data 1027 are input to the buffers 1159 to 1162 in descending order and output to the memory without adding any line delay.

Processing up to the pixel data 1027 has been described above. From then on, delays corresponding to three pixels, two pixels, one pixel, and zero pixels are sequentially added to the pixel data input to the line delay elimination circuit 1100, and the pixel data are output from the line delay elimination circuit 1100. Since the pixel data arranged in descending order are output from the line delay elimination circuit 1100 to the memory, the pixel data are converted to the ascending order and then stored in the memory. With the above-described processing, in the cycles C5 to C8, pixel data that is the processing result of the first pixel in each of the input data trains 801 to 804 is output. In the cycles C9 to C12, pixel data that are the processing results of the second to fifth pixels in each of the input data trains 801 to 804 are output.

In this way, the pixel data that are the processing results for the pixels in the band area 230 are accumulated in the image output unit 103, and as a result, the error diffusion result of the band area 230 is obtained. As described above, the image output unit 103 includes the module delay elimination circuit 1000 and the line delay elimination circuit 1100. The image output unit 103 adds a delay such that the line delay and the module delay added by the image supply unit 101 are eliminated, and then outputs the pixel data.

(Example of Processing for Band Area with Five Lines)

Error diffusion processing for a band area with five lines read from an input image by the image input unit 100 will be described below as another detailed example of processing. Reference pixels and diffusion coefficients in the error diffusion processing are the same as those shown in FIG. 3.

Figure 15:
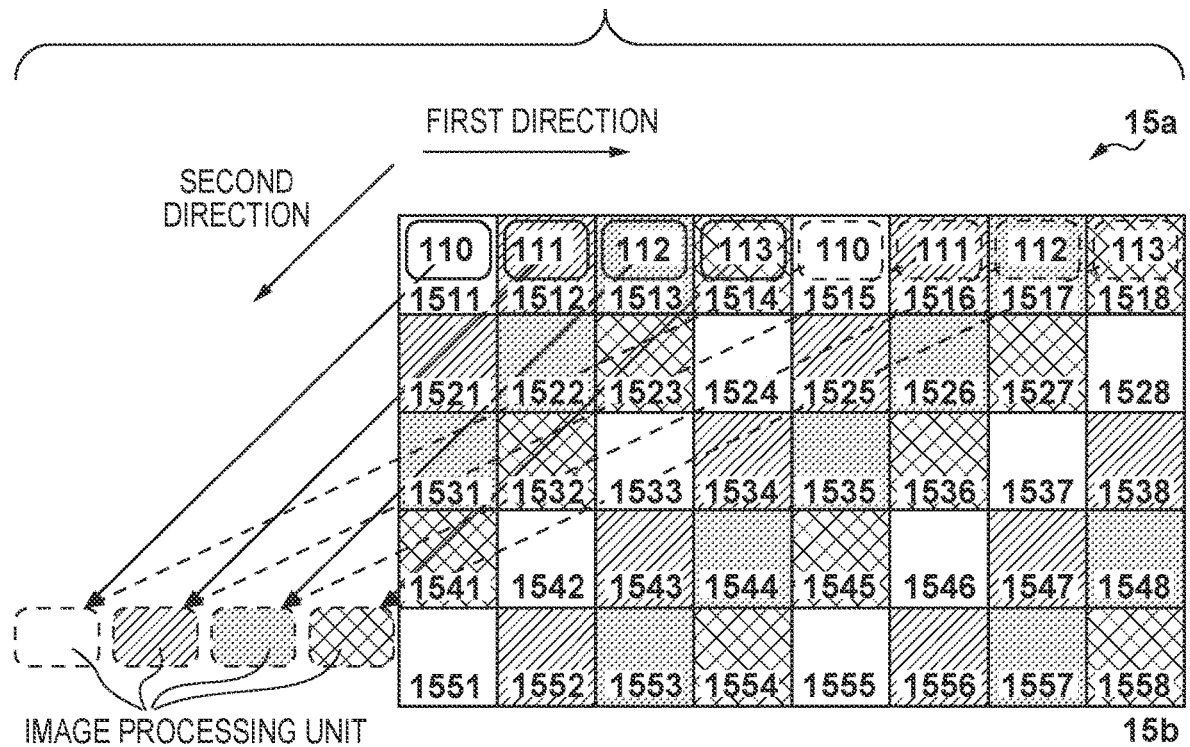
FIG. 15 is a view for explaining processing of a band area with five lines according to the first embodiment.

The method of determining, for pixel data of each pixel, the image processing units 110 to 113 is the same as in the case of processing for the band area with four lines. In this processing example, an image processing unit processes a pixel in the fifth data train, and then processes a processable pixel in the first data train. In FIG. 15, 15a shows the schematic view of this processing order.

The processing order in this example will be described with reference to 15a. In the cycle C1, the processable pixel is only a pixel 1511 at the processing start position, and the image processing unit 110 processes the pixel 1511. Then, a pixel 1512 for which processing of all the reference pixels is completed becomes a processable pixel. The pixel 1512 is located in the main scanning direction from the processed pixel 1511, and is therefore processed in the cycle C2 by the next image processing unit 111.

In the cycle C2, the pixel 1512 is processed by the image processing unit 111, and as a result, pixels 1513 and 1521 change to processable pixels. The pixel 1513 located in the main scanning direction is processed in the cycle C3 by the next image processing unit 112. On the other hand, the pixel 1521 located in the second direction different from the first direction is processed in the cycle C3 by the image processing unit 111 that has completed the processing of the reference pixel in the cycle C2. In this way, the second direction is determined to be the direction from the pixel 1512 to the pixel 1521, that is, the direction advancing downward by one data train and leftward by one pixel.

The pixel 1521 may be processed by the image processing unit 110 or 113. In this case, however, the image processing unit 110 processes the pixel 1511 in the cycle C1, waits in the cycle C2, and processes the pixel 1521 in the cycle C3. When the image processing unit 111 processes the pixel 1521, the effect of speeding up the processing by parallelization improves. Additionally, when the image processing unit 113 processes the pixel 1521, the diffusing error of the pixel 1511 in the cycle C1 needs to be held up to the cycle C3. Since the error needs to be held in longer cycles, the number of buffers configured to hold the diffusing error in the circuit increases. When the image processing unit 111 processes the pixel 1521, the number of buffers configured to hold the diffusing error can be decreased.

From the cycle C4 as well, the image processing units 110 to 113 perform the same processing as described above. 15b shows pixels to be processed by the image processing units 110 to 113 in the cycles C1 to C9 in this arrangement. As in the case in which the number of lines is four, image processing units that do not perform processing exist in the cycles C1 to C8. From the cycle C9, the pixel data of four pixels are simultaneously processed by the image processing units 110 to 113.

In this processing example as well, after the (for example, M) pixels existing in the (for example, M) data trains are processed in the second direction, the image processing unit processes the processable pixel existing in the first data train next. In this processing example as well, since the connection relationship between the image processing units is the same as in the processing for the band area with four lines, the image processing units 110 to 113 having the same circuit arrangement as in the processing for the band area with four lines can be used.

A method of supplying pixel data to the image processing units 110 to 113 by the image supply unit 101 will be described next. Processing performed when the image input unit 100 reads the band area 1430 with five lines shown in FIG. 2 will be described here. FIG. 2 shows processing target pixels (processing cycles to process processing target pixels are indicated by numerical values) in the processing cycles and the image processing units as the pixel data supply destinations.

The image supply unit 101 includes a line delay circuit and a module delay circuit. In this processing example, since the number of lines of the band area is five, the line delay circuit can add a line delay corresponding to four pixels at maximum. The arrangement of the line delay circuit is the same as that of the line delay circuit 800 except this point, and a detailed description thereof will be omitted. That is, the line delay circuit directly outputs pixel data from the first data train, and outputs pixel data from the second to fifth data trains after adding a line delay corresponding to one to four pixels.

The arrangement of the module delay circuit is the same as that in a case in which the number of lines of the band area is four, and a detailed description thereof will be omitted. That is, of the pixel data of four pixels input from the line delay circuit, the first pixel data is immediately input to the image processing unit 110. In addition, the second to fourth pixel data are input to the image processing units 111 to 113 after one or three cycles.

As described above, the image supply unit 101 can supply pixel data to the image processing units 110 to 113 in the order shown in FIG. 2 by using the line delay circuit and the module delay circuit.

The image output unit 103 eliminates the line delay and the module delay of the pixel data obtained by the processing of the image processing units 110 to 113 and outputs the pixel data to the memory (for example, a DRAM), as in a case in which the number of lines of the band area is four. The image output unit 103 includes a module delay elimination circuit and a line delay elimination circuit. The arrangement of the module delay elimination circuit is the same as in the case in which the number of lines is four, and a detailed description thereof will be omitted. That is, the module delay elimination circuit outputs the pixel data input from the image processing units 110 to 112 in the same cycle to the line delay elimination circuit after three to one cycle, and also outputs the pixel data input from the image processing unit 113 directly to the line delay elimination circuit. In FIG. 10, 10c shows pixel data 1023 to 1040 output from the module delay elimination circuit to the line delay elimination circuit in the cycles C1 to C10. As in the case in which the number of lines of the band area is four, the delay difference added by the module delay circuit is eliminated, as can be seen.

The arrangement of the line delay elimination circuit is the same as that of the line delay elimination circuit 1100 except that a line delay corresponding to four pixels can be added at maximum because the number of lines of the band area is five, and a detailed description thereof will be omitted. That is, the line delay elimination circuit adds a line delay corresponding to four to zero pixels to each of pixel data 1035 to 1039 (corresponding to the first to fifth data trains, respectively), and outputs the pixel data to the memory (for example, a DRAM). From then on, the processing of inputting the pixel data of four pixels for each data train to the line delay circuit and outputting the pixel data to the memory after adding a delay corresponding to four to zero pixels is repeated.

(Operation in First Embodiment)

Figure 12:
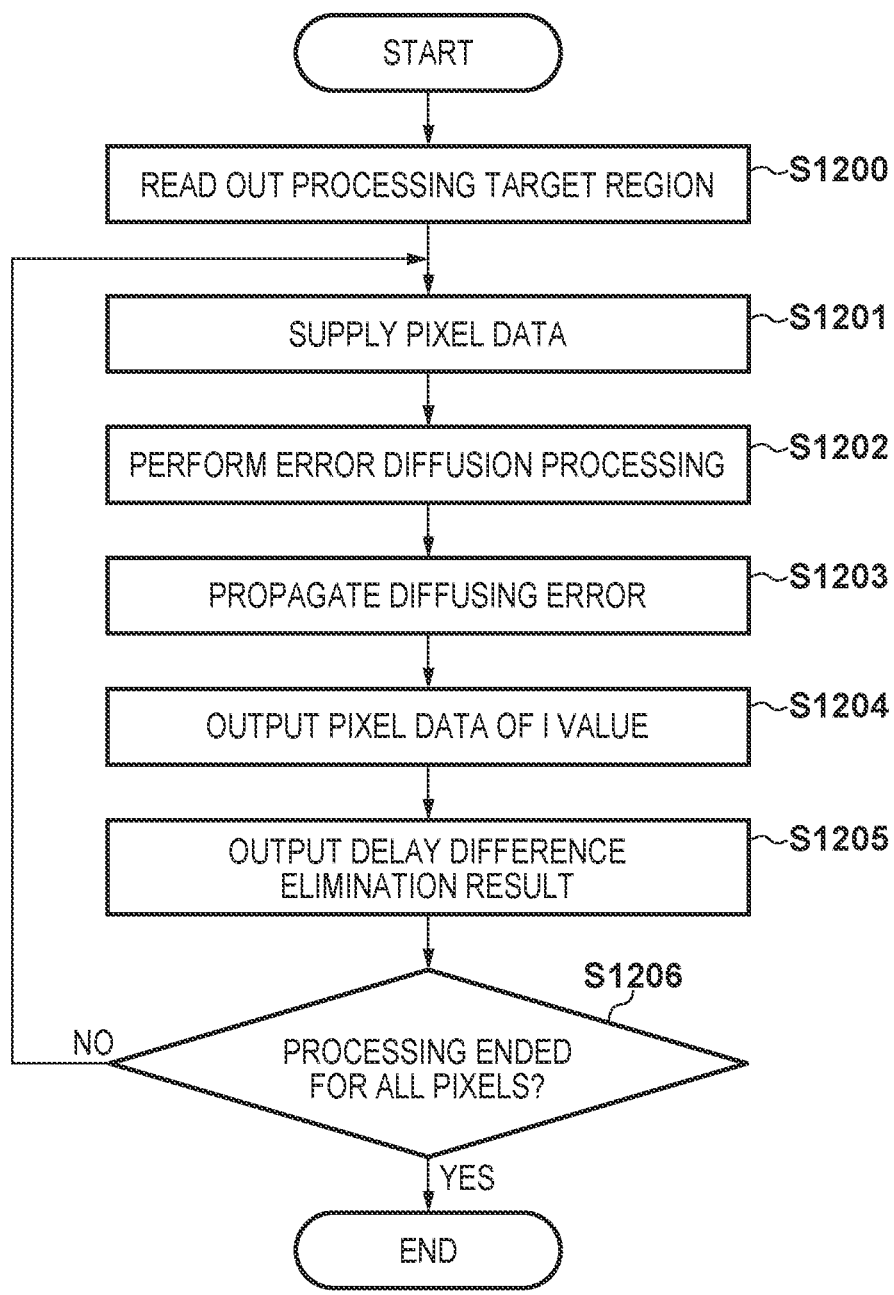
FIG. 12 is a flowchart showing an example of an image processing procedure according to the first embodiment.

An operation in the first embodiment will be described with reference to the flowchart of FIG. 12. In step S1200, the image input unit 100 reads out the data of a band area. In step S1201, the image supply unit 101 acquires pixel data of J value from the image input unit 100 by four pixels. The image supply unit 101 then adds line delays and module delays to the acquired pixel data, as described above, and outputs them to the image processing units 110 to 113.

As already described above, the order of pixel processing by the image processing units 110 to 113 is determined in advance. That is, processing results for N continuous pixels included in the first pixel line of a processing target region are sequentially generated in a predetermined order by the image processing units different from each other. For example, for pixels that continue in the first direction (main scanning direction) as many as the number of parallel processes, the different image processing units 110 to 113 perform processing (quantization processing). In addition, processing results for N continuous pixels included in the first pixel line are generated in continuous processing cycles in a predetermined order by the image processing units different from each other. Note that in the above-described processing example, one image processing unit not only processes only pixels included in one pixel line but processes at least one of pixels included in each of the first to Mth pixel lines.

Additionally, each of the plurality of image processing units generates a processing result for the first pixel included in the first pixel line and then generates a processing result for the second pixel. The second pixel is a pixel that is included in the second pixel line different from the first pixel line in the processing target region and changes to a processable pixel in accordance with the generation of the processing result for the first pixel. For example, for a processable pixel that appears in the second direction from the processing target pixel as a result of processing performed for the processing target pixel by an image processing unit, the same image processing unit performs processing. One image processing unit repeats processing of a pixel located in the second direction. When processing of a pixel in the Mth pixel line is performed, the image processing unit then performs processing of a processable pixel existing in the first pixel line. Here, the processing target region includes M pixel lines.

In addition, the second pixel can be a pixel located at a predetermined relative position in the second direction from the first pixel. That is, the relative positions of the first pixel and the second pixel depend on the positions of reference pixels and can be the same independently of the position of the first pixel. For example, if the position of the first pixel is on the ith row and jth column, the position of the second pixel can be on the (i+1)th row and (j−a)th column. Here, a is an arbitrary integer (a positive integer, a negative integer, or zero) determined by the positions of the reference pixels. For example, a=1 in a case in which the reference pixels shown in FIG. 3 are used.

On the other hand, when the processing target region includes M (M>N) pixel lines, the N image processing units start processing of the Mth pixel line before the processing of the first pixel line is completed. That is, in this embodiment, processing of the band area is completed from left to right.

The image supply unit 101 supplies the pixel data to the plurality of image processing units such that the processing as described above can be implemented. For example, the image supply unit 101 can sequentially supply the pixel data of N continuous processing target pixels included in the first pixel line to the N image processing units in a predetermined order. In addition, the image supply unit 101 can supply the pixel data of the second pixel to the image processing unit that has completed processing of the first pixel. Furthermore, to one image processing unit, the image supply unit 101 can sequentially supply the pixel data of a processing target pixel in the first pixel line to the pixel data of a processing target pixel in the Mth pixel line and then supply the pixel data of a processing target pixel in the first pixel line.

In step S1202, the image processing units 110 to 113 perform error diffusion processing. Additionally, in step S1203, the image processing units 110 to 113 perform propagation of diffusing errors. In this embodiment, when the image processing unit 110 processes the processing target pixel, the image processing units that have processed the reference pixels are fixed. That is, as indicated by 13a in FIG. 13, the pixel on the upper left side of the processing target pixel is processed by the image processing unit 112, the pixels on the upper and left sides of the processing target pixel are processed by the image processing unit 113, and the pixel on the upper right side of the processing target pixel is processed by the image processing unit 110. This is because the processing order of the pixels continuing in the first direction and the processing order of the pixels continuing in the second direction by the image processing units 110 to 113 are determined in advance. That is, this is because four pixels continuing in the first direction (main scanning direction) are processed by the image processing units 110 to 113, respectively, and pixels continuing in the second direction (left downward direction) are processed by the same image processing unit. This also applies to a case in which the image processing units 111 to 113 process the processing target pixels, as indicated by 13b to 13d in FIG. 13. Additionally, this relationship is constant independently of the number of lines (for example, irrespective of whether the number of lines is four or five).

Figure 13:
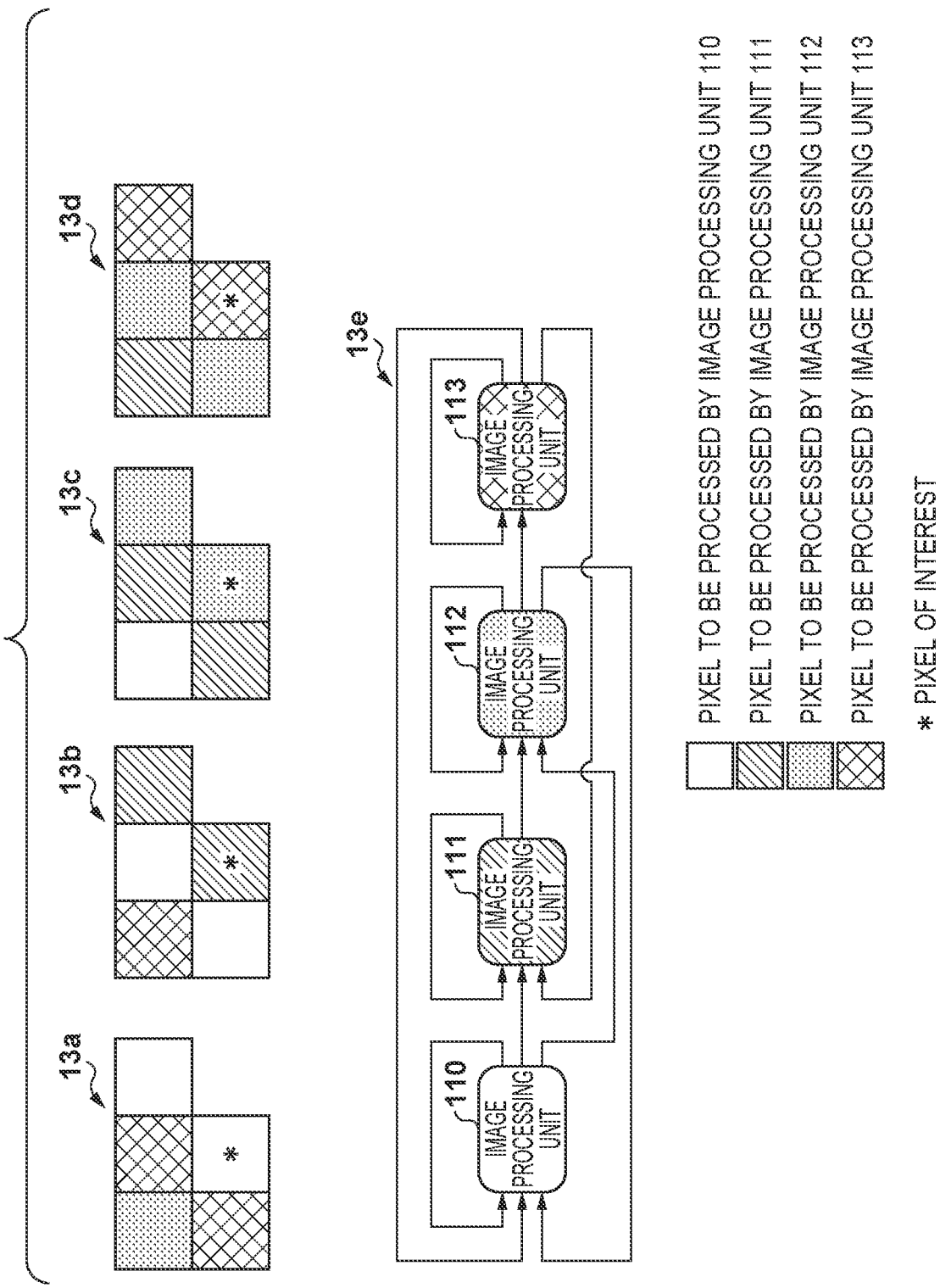
FIG. 13 is a view showing an example of the connection relationship of image processing units according to the first and second embodiments.

As described above, in this embodiment, the relative positions of the image processing unit that processes the processing target pixel and the image processing units that have processed the reference pixels (that is, propagate errors) are fixed. Hence, when the processing units are connected so as to propagate the diffusing errors from the image processing units that have processed the reference pixels to the image processing unit that processes the processing target pixel, error propagation processing can be performed. This connection relationship need not be changed in the course of processing, and also need not be changed even when the size (for example, height or length) of the processing target region is changed. In FIG. 13, 13e shows an example of the connection relationship of the image processing units 110 to 113.

Note that the processing results (for example, the quantization errors or diffusing errors) to be referred to may be held by the image processing unit that processes the processing target pixel or the image processing units that have processed the reference pixels. In any case, the processing results to be referred to can be transferred at predetermined timings from the image processing units that have processed the reference pixels to the image processing unit that processes the processing target pixel. In one embodiment, the first image processing unit acquires the processing result for one of the plurality of reference pixels from the memory (for example, the error memory 403) of the first image processing unit, which stores the processing result of the first image processing unit. For example, when the first image processing unit processes the second pixel next to the first pixel, as described above, the processing result of the first pixel that is the reference pixel is stored in the memory of the first image processing unit. Additionally, the first image processing unit can acquire the processing result for another one of the plurality of reference pixels from the second image processing unit different from the first image processing unit. As described above, the image processing unit that is the acquisition source of the processing result is determined in advance.

Note that the image processing unit that processes the processing target pixel and the image processing units that have processed the reference pixels need not be directly connected. For example, in the example shown in 13e, the image processing unit 111 may receive the processing result (for example, the quantization error or the diffusing error) of the image processing unit 113 via the image processing unit 110. That is, in one embodiment, the plurality of image processing units may be connected in series in a ring shape, and each image processing unit may be connected to only two other image processing units.

In step S1204, the image processing units 110 to 113 output pixel data of I value. In step S1205, the image output unit 103 eliminates the delay difference between the output pixel data of I value and records the pixel data in the memory. In step S1206, the image supply unit 101 determines whether the processing is completed for all the pixels. If the processing is not performed for all the pixels, the process returns to step S1201 to repeat scanning until the processing is completed for all the pixels. If the processing is performed for all the pixels, the processing shown in FIG. 12 ends.

In the above description, if the number of lines of the band area changes, the line delay circuit and the line delay elimination circuit of different arrangements are used. However, the line delay circuit and the line delay elimination circuit having the same arrangements may be used independently of the number of lines. For example, processing for a case in which the number of lines is four can be performed using the line delay circuit and the line delay elimination circuit for the above-described case in which the number of lines is five. In this case, the portions configured to add a line delay corresponding to four pixels in the line delay circuit and the line delay elimination circuit are not used.

In addition, the image input unit 100, the image supply unit 101, the image output unit 103, and a path control unit 2002 (to be described later) may be hardware circuit but may be implemented by software. That is, at least some of these processing units may be implemented by a computer. FIG. 20 is a view showing the basic arrangement of a computer capable of implementing these processing units. Referring to FIG. 20, a processor 2110 is, for example, a CPU and controls the operation of the entire computer. A memory 2120 is, for example, a RAM and temporarily stores programs and data. A computer-readable storage medium 2130 is, for example, a hard disk or a CD-ROM and stores programs and data for a long time. In this embodiment, a program that is stored in the storage medium 2130 and implements the functions of the units is loaded into the memory 2120. Then, the processor 2110 operates in accordance with the program on the memory 2120, thereby implementing the functions of the units. Referring to FIG. 20, an input interface 2140 is an interface configured to acquire information from an external device. In addition, an output interface 2150 is an interface configured to output information to an external device. A bus 2160 connects the above-described units to enable data exchange.

As described above, according to this embodiment, even in a case in which the number of lines or the length of the band area changes, the pixels to be processed by the image processing units need not be switched. Additionally, even in the case in which the number of lines or the length of the band area changes, the image processing units need only perform the same processing. Hence, the image processing units having the same arrangement can be used. For this reason, irrespective of the number of lines or the length of the band area, parallel processing can be performed using the image processing units of the same arrangement. In particular, in this embodiment, each of the plurality of image processing units can acquire a processing result for a reference pixel from the same image processing unit independently of the processing target pixel and independently of the number of lines of the band area. It is therefore possible to perform parallel image processing without changing the processing of each image processing unit and the connection between the image processing units even if the number of lines of the band area changes.

Second Embodiment

In the second embodiment, an arrangement for switching the number of parallel processes in accordance with the number of colors of an input image will be described. In the second embodiment as well, a case in which an image processing apparatus performs error diffusion processing of converting a J-value image into an I-value image (i<J) will be described. In the following description as well, reference pixels and diffusion coefficients shown in FIG. 3 are used.

The image processing apparatus according to this embodiment includes four image processing units 110 to 113, as in the first embodiment. In this embodiment, the operation mode is switched in accordance with the number of colors of an input image. For example, the image processing apparatus can operate in a first operation mode in which N image processing units parallelly perform image processing for one color of an input image. As one example, if the number of colors of an input image is one, the four image processing units can parallelly perform processing. In addition, the image processing apparatus can operate in a second operation mode. In the second operation mode, a first group of the N image processing unit parallelly performs image processing for the first color of an input image, and a second group of the N image processing units parallelly performs image processing for the second color of the input image. As one example, if the number of colors of an input image is two, two image processing units can parallelly process the pixel data of each color. In addition, if the number of colors of an input image is one, one image processing unit can process the pixel data of each color.

In one embodiment, the N image processing units are classified into L groups in accordance with the number L of colors of an input image. Here, the groups may include the same number of image processing units, and the number may be N/L. The image processing units included in each group can be connected such that the image processing units included in each group can transfer processing results. Each image processing unit can transfer a processing result via this connection. The data transfer path may be controlled by the path control unit 2002 such that such a connection is possible, as will be described later.

FIG. 7 is a block diagram showing an example of the arrangement of an image processing apparatus 195 according to this embodiment. The arrangements of an image input unit 100, an image supply unit 101, the image processing units 110 to 113, and an image output unit 103 are the same as in the first embodiment, and different points will be described below. The image processing apparatus 195 further includes a data transfer path 2001. The image processing units 110 to 113 can propagate diffusing errors via the data transfer path 2001.

(When Number of Colors of Input Image is Two)

An arrangement in which the number of colors of an input image is two, and two image processing units parallelly process the pixel data of each color will be described first. A case in which each pixel of the input image has cyan pixel data and magenta pixel data will be described below. Each of the cyan pixel data and the magenta pixel data is data of J value.

The image input unit 100 reads out a band area for each color of the input image. For example, as indicated by 16a in FIG. 16, the image input unit 100 can read out a band area 2210 of cyan and a band area 2200 of magenta.

Figure 19:
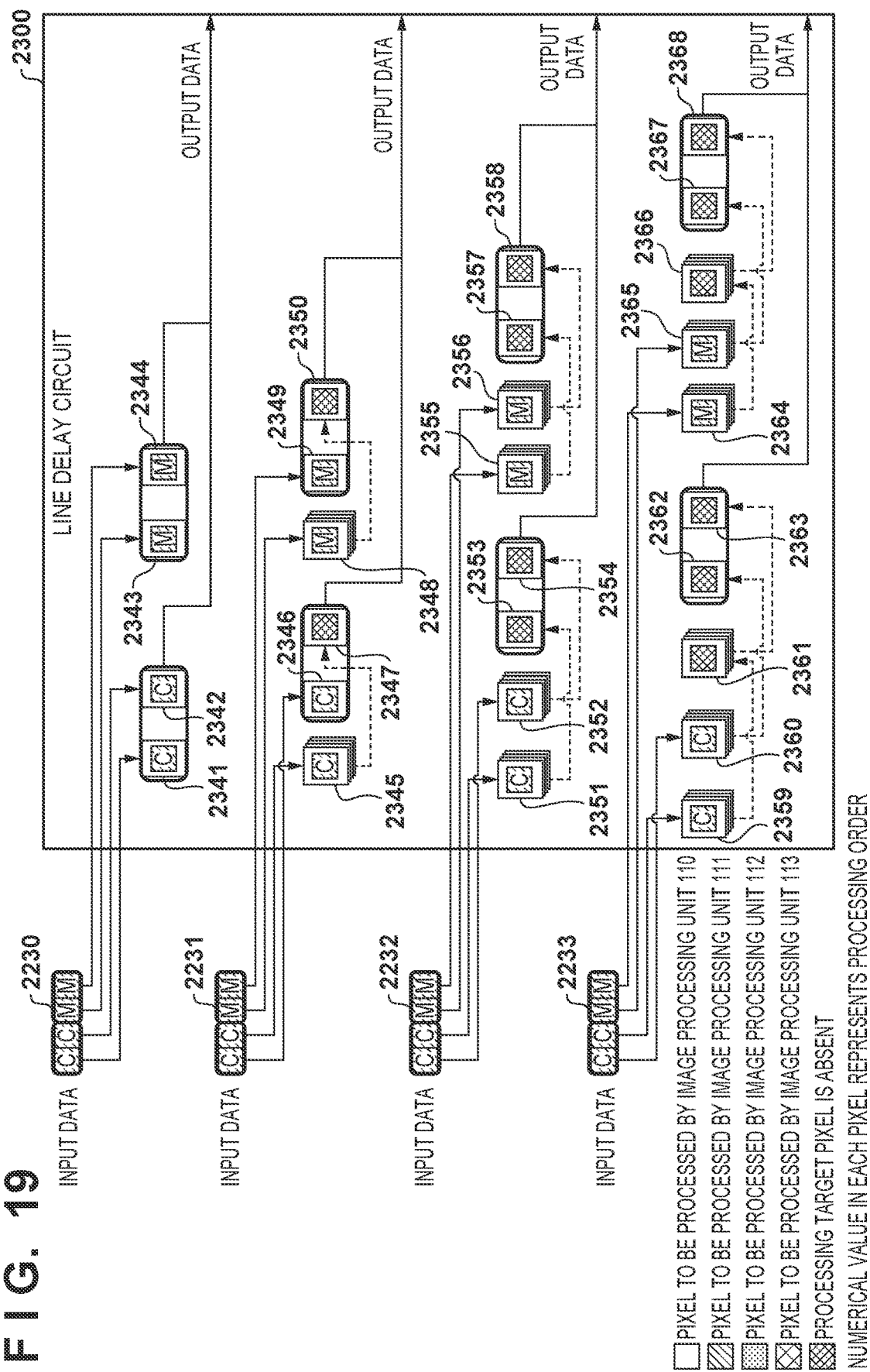
FIG. 19 is a view for explaining the arrangement of a line delay circuit according to the second embodiment.

The image supply unit 101 includes a line delay circuit 2300 and a module delay circuit 900. FIG. 19 shows an example of the arrangement of the line delay circuit 2300 in a case in which the number of colors of the input image is two. The line delay circuit 2300 includes buffers 2341 to 2368.

Figure 16:
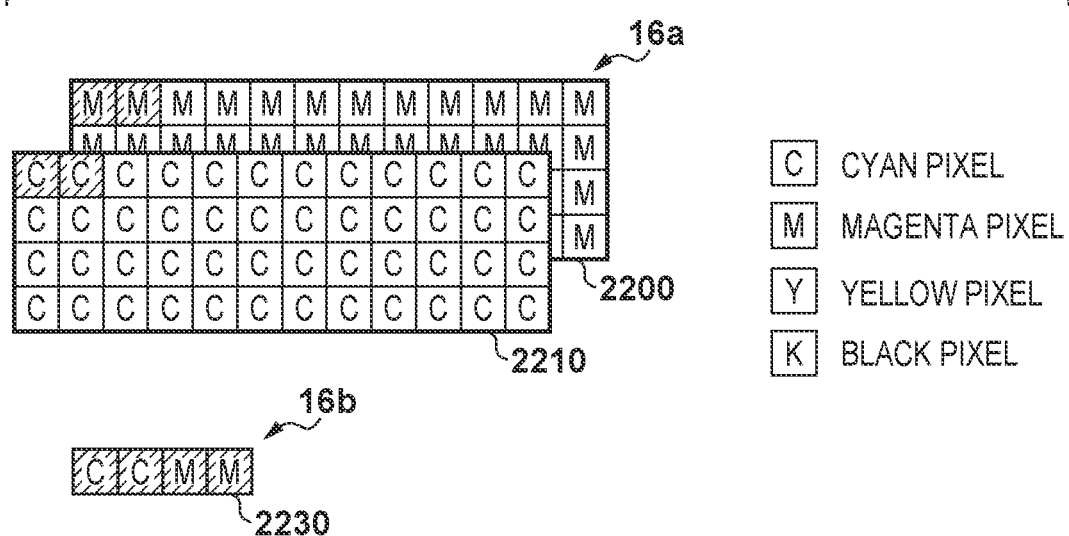
FIG. 16 is a view for explaining processing of a band area according to the second embodiment.

As indicated by 16b in FIG. 16, the line delay circuit 2300 acquires the pixel data of two cyan pixels and two magenta pixels. In the first cycle, the line delay circuit 2300 can acquire the pixel data of two pixels at the left end of the first data train, represented by hatching in 16a. In the next cycle, the line delay circuit 2300 can acquire the pixel data of two pixels at the left end of the second data train. When the pixel data in the final data train are acquired, the line delay circuit 2300 can repeat the operation of acquiring unacquired pixel data in the first data train again. This acquisition processing is the same as that or the line delay circuit 800 except that the pixel data of not four but two continuous pixels are acquired.

The line delay circuit 2300 adds a line delay to thus acquired pixel data 2230 to 2233. In this processing example, a line delay is given for each color. To do this, the line delay circuit 2300 includes holding buffers and output buffers for each color. For example, to give a line delay of one pixel to the input data 2231 from the second data train, the line delay circuit 2300 includes the holding buffers 2345 and 2348 and the output buffers 2346, 2347, 2349, and 2350. With this arrangement, the cyan pixel data held by the buffer 2345 and the magenta pixel data held by the buffer 2348 can simultaneously be output together with the pixel data from the second data train, which are input next. When the delay buffers and the holding buffers in numbers according to the number of colors are provided in the line delay circuit 2300, a desired line delay can be given.

The arrangement of the module delay circuit 900 is the same as in the first embodiment, and a description thereof will be omitted. In the pixel data 2230 input to the module delay circuit 900, the pixel data of two magenta pixels and the pixel data of two cyan pixels are arranged. After a module delay is added, the pixel data 2230 are input to the image processing units 110 to 113. Hence, the magenta pixel data are processed by the image processing units with a delay of two cycles with respect to the cyan pixel data. Not to cause a delay difference between the colors, a module delay may be added only to the pixel data of the same color. For example, a module delay circuit that does not use buffers 912, 914, 915, and 916 but includes buffers 911 and 913 can be used. In this case, no module delay is added between the magenta pixel data and the cyan pixel data.

Figure 14:
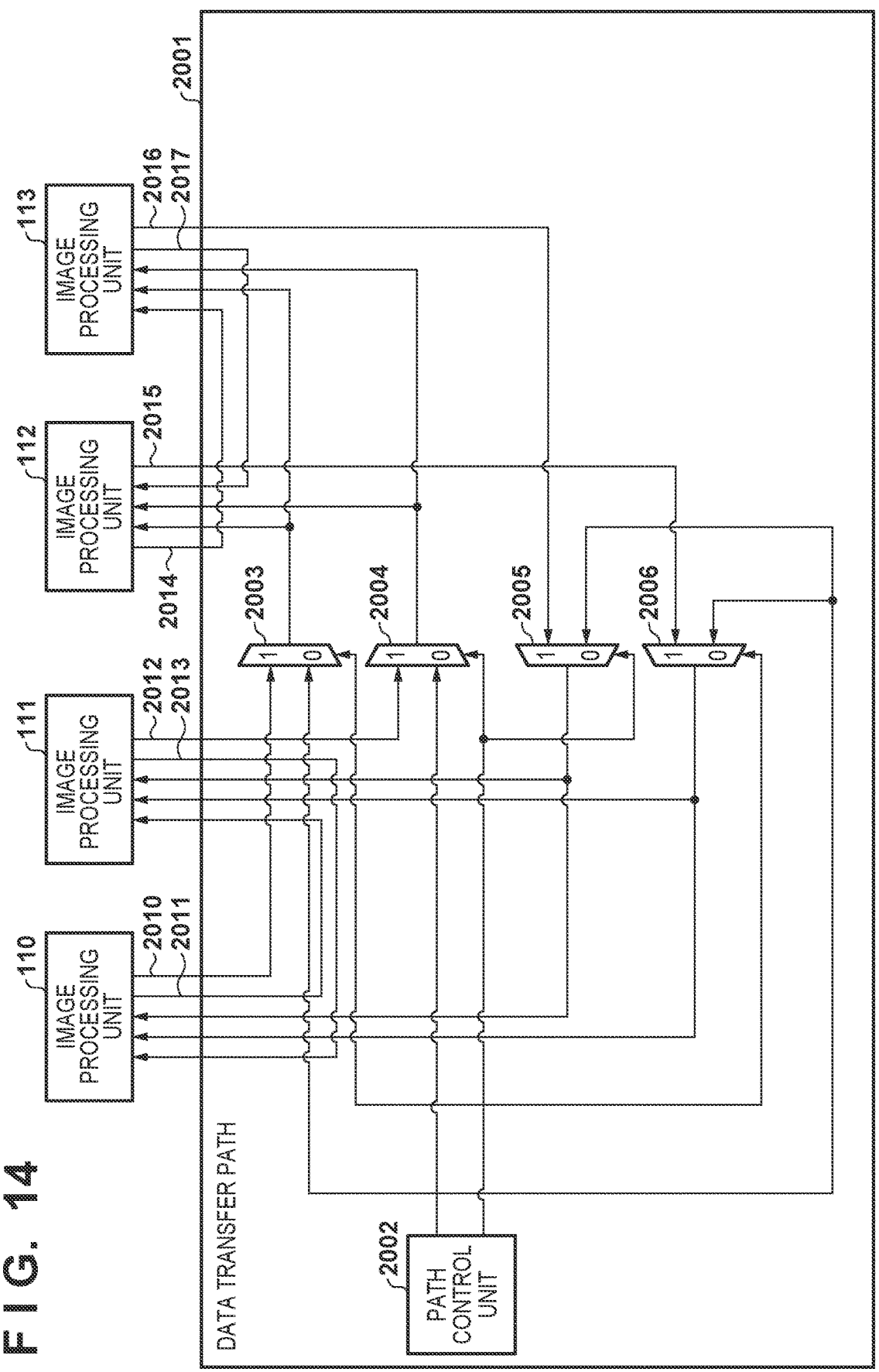
FIG. 14 is a view for explaining a data transfer path according to the second embodiment.

FIG. 14 shows a detailed arrangement of the data transfer path 2001. The data transfer path 2001 includes the path control unit 2002, selectors 2003 to 2006, and paths 2010 to 2017. The paths 2010 to 2017 are the diffusing error propagation paths between the image processing units 110 to 113. The path control unit 2002 controls data transfer via the paths 2010 to 2017.

For example, when the number of colors of an input image is one, the path control unit 2002 can set the selectors 2003 to 2006 to 1 to enable all paths between the image processing units 110 to 113. In this state, the four image processing units 110 to 113 can simultaneously process the image data of one color. Note that FIG. 14 shows the existence of paths between all combinations of the image processing units 110 to 113 in this case. However, to reduce redundant paths, only necessary paths may be provided based on the relationship between the processing target pixel and the reference pixels, as shown in 13e.

When the number of colors of an input image is two, the path control unit 2002 can set the selectors 2003 to 2006 to 0. In this case, the path between the image processing unit 110 and the image processing unit 111 and the path between the image processing unit 112 and the image processing unit 113 are enabled, but the other paths between the image processing units are not enabled. In this state, two image processing units can parallelly process pixel data of one color.

The image output unit 103 eliminates the line delay and the module delay for the pixel data processed by the image processing units 110 to 113 and outputs the pixel data to a memory (a DRAM or the like) on a color basis. By the same method as in the first embodiment, the image output unit 103 can give a delay so as to eliminate the delay difference by the line delay and the module delay given by the image supply unit 101.

The operation of the image processing apparatus 195 in the second embodiment will be described with reference to the flowchart of FIG. 12. In step S1200, first, the paths of the data transfer path 2001 are set. The paths are determined in accordance with the combination of the number of colors of an input image and the number of image processing units.

For example, when the number of colors of an input image is one, control of the paths by the path control unit 2002 is performed as described above. In this case, the subsequent processing can be performed as in the first embodiment, and a description thereof will be omitted.

In addition, when the number of colors of an input image is four, the pixel data of each color are processed by one image processing unit. The path control unit 2002 controls the paths between the image processing units such that one image processing unit processes the pixel data of one color. In this case, connection between the image processing units is not needed. From then on, each image processing unit sequentially performs processing for the pixel data of each color, and a description of the processing will be omitted.

When the number of colors of an input image is two, control of the paths by the path control unit 2002 is performed as described above. Processing in this case will be described below. In step S1200, the image input unit further reads out the processing target region of each color as indicated by 16a in FIG. 16.

In step S1201, the image supply unit 101 acquires pixel data of four pixels from the image input unit 100, as indicated by 16b in FIG. 16, gives line delays and module delays, and outputs the pixel data to the image processing units. In this example as well, since error diffusion processing is performed using the reference pixels shown in FIG. 3, the line delay is one pixel, and the module delay is one cycle, as in the first embodiment. The line delay can be given for each color, as described above.

As in the first embodiment, in step S1202, the image processing units 110 to 113 perform error diffusion processing. In step S1203, the image processing units 110 to 113 perform propagation of diffusing errors. In this embodiment, the paths of connection are set in accordance with the relationship between the number of colors and the number of image processing units, and propagation of diffusing errors is performed, as in step S1200. As described in the first embodiment, the connection relationship between the image processing units need not be changed even in a case in which the height or length of the band area is changed.

In step S1204, the image processing units 110 to 113 output pixel data of I value. In step S1205, the image output unit 103 eliminates the delay difference between the pixel data of I value and records the pixel data in the memory for each color. The process of step S1206 is the same as in the first embodiment.

As described above, according to this embodiment, it is possible to perform parallel processing for each of input images with different numbers of colors. In addition, when the data transfer path 2001 is switched, parallel processing can be controlled in accordance with the number of colors.

Third Embodiment

The processing performed by the image processing apparatus according to the present invention is not limited to error diffusion processing. For example, the image processing apparatus according to the present invention can perform processing using feedback. As an example, an image processing apparatus according to the third embodiment parallelly performs processing of detecting a horizontal line or a vertical line in image data. The processing according to this embodiment can be implemented by an image processing apparatus 190 shown in FIG. 1, and a detailed description thereof will be omitted.

Figure 6F:
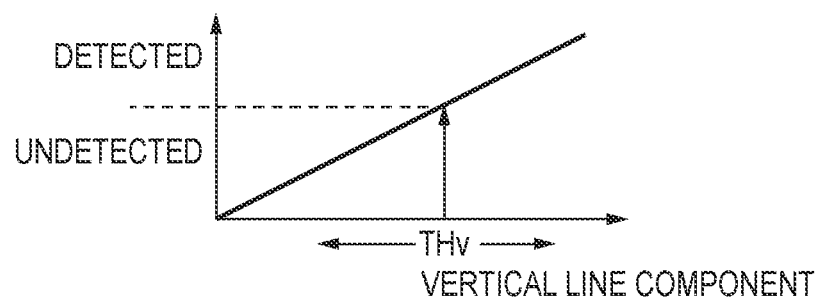

Horizontal line or vertical line detection processing executed by image processing units 110 to 113 will be described first with reference to FIGS. 6A to 6H. FIG. 6A shows a document image 610 and a detection result 620 of a drawing, horizontal lines, and vertical lines for the document image 610. This processing can be applied as preprocessing of, for example, OCR (Optical Character Recognition) processing for a document, and the ruled lines or frame lines of a diagram region can be extracted. When a diagram region in the document image 610 is specified, or ruled lines are deleted using the processing, the accuracy of OCR can be expected to improve.

Horizontal line or vertical line detection processing can be implemented in accordance with a procedure shown in FIG. 6B. First, a vertical line component extraction filter and a horizontal line component extraction filter are applied to pixel data of 3 pixels×3 pixels with a processing target pixel at the center, as shown in FIG. 6C. FIG. 6D shows an example of the filter coefficients of the vertical line component extraction filter, and FIG. 6E shows an example of the filter coefficients of the horizontal line component extraction filter. When the vertical line component extraction filter is applied, a vertical line component is extracted. When the horizontal line component extraction filter is applied, a horizontal line component is extracted.

Figure 6G:
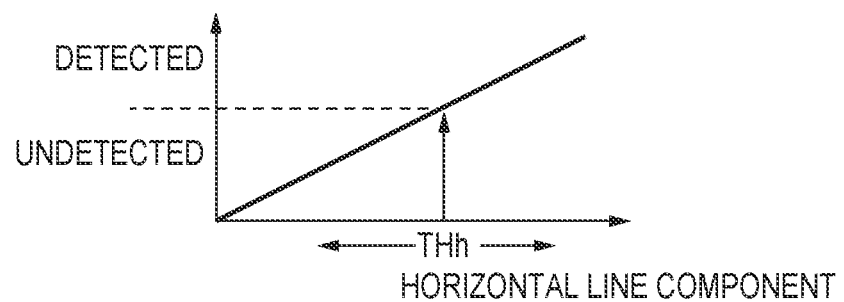

Vertical line determination and horizontal line determination are performed using the extracted components. The vertical line determination can be performed by comparing a vertical line component with a threshold THv, as shown in FIG. 6F. For example, if the vertical line component is equal to or more than the threshold THv, it can be determined that a vertical line exists at the position of the processing target pixel. If the vertical line component is less than the threshold THv, it can be determined that a vertical line does not exist at the position of the processing target pixel. Similarly, the horizontal line determination can be performed by comparing a horizontal line component with a threshold THh, as shown in FIG. 6G For example, if the horizontal line component is equal to or more than the threshold THh, it can be determined that a horizontal line exists at the position of the processing target pixel. If the horizontal line component is less than the threshold THh, it can be determined that a horizontal line does not exist at the position of the processing target pixel.

Here, the magnitudes of the thresholds THv and THh serving as the determination criteria of the vertical line and the horizontal line can be adjusted by feedback control. For example, the thresholds can be changed in accordance with the determination result of an adjacent pixel such that the same determination result as the determination result of the adjacent pixel can easily be obtained. As one example, in a case in which it is determined that a vertical line exists on a neighboring pixel which exists in the vertical direction from the processing target pixel and for which detection processing is already completed, the threshold THv can be made small to easily determine that a vertical line exists on the processing target pixel. Similarly, in a case in which it is determined that a horizontal line exists on a neighboring pixel which exists in the horizontal direction from the processing target pixel and for which detection processing is already completed, the threshold THh can be made small to easily determine that a horizontal line exists on the processing target pixel.

Figure 6H:
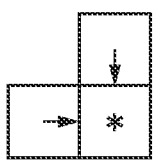

When processing image data in the order of raster processing (scanning from left to right and from above to below), the determination for the processing target pixel indicated by * in FIG. 6H can be performed by referring to the vertical line determination result of an adjacent pixel on the upper side and the horizontal line determination result of an adjacent pixel on the left side. In a case in which parallel processing is performed using the image processing units 110 to 113 in the following way, and an image processing unit performs determination for the processing target pixel, the vertical line determination result for the adjacent pixel on the upper side is held by this image processing unit and can be referred to for the determination. On the other hand, the horizontal line determination result for the adjacent pixel on the left side is held by another image processing unit and can be transferred between the image processing units and referred to for the determination. To eliminate the difference between the timing of determining the horizontal line determination result of the adjacent pixel and the timing of referring to the horizontal line determination result of the processing target pixel, the horizontal line determination result of the adjacent pixel may be held by the image processing unit that has processed the adjacent pixel or may be held by the image processing unit that processes the processing target pixel. This point is also the same as in the first embodiment.

Figure 17A:
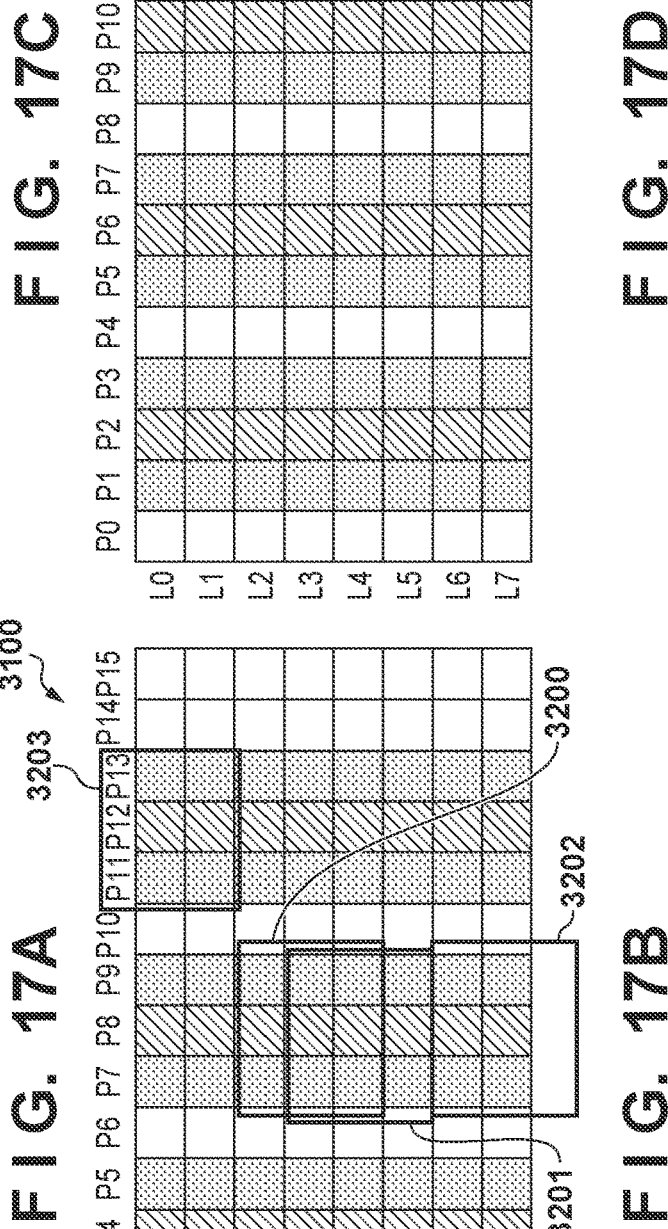
FIGS. 17A to 17D are views for explaining image processing according to the third embodiment.

The image processing units 110 to 113 can process the pixels in a processing target region 3100 as in the first embodiment. An example of a parallel processing method will be described below with reference to FIG. 17A. FIG. 17A shows the processing target region 3100 read out by the image input unit 100. For the sake of description, data train numbers L0 to L7 and pixel numbers P0 to P15 are added to the processing target region 3100.

In a cycle C1, the image processing unit 110 processes a processing target pixel (L0:P0) represented by the data train number L0 and the pixel number P0 (to be expressed as "data train number:pixel number hereinafter). As a result, a processing target pixel (L0:P1) located in the main scanning direction and a processing target pixel (L1:P0) located in the second direction different from the main scanning direction become processable. Here, the second direction is determined to the direction advancing downward by one pixel.

In a cycle C2, the image processing unit 111 processes the processing target pixel (L0:P1) located in the main scanning direction. In addition, the image processing unit 110 processes the processing target pixel (L1:P0) located in the second direction. Processing from a cycle C3 is also the same as in the first embodiment.

The image supply unit 101 supplies pixel data to the image processing units 110 to 113 such that the image processing units 110 to 113 parallelly execute determination processing. FIG. 17A shows a pixel group whose pixel data are supplied to the image processing unit 110. Processing target pixels to be processed by the image processing unit 110 are represented by hatching. In addition, a pixel group of 3 pixels×3 pixels near each processing target pixel is represented by halftone dots. The image supply unit 101 supplies the pixel data of pixels represented by hatching and halftone dots to the image processing unit 110, and the image processing unit 110 obtains a processing result for the processing target pixel represented by hatching.

The pixel data of pixels having the same pixel number are supplied to the image processing unit 110 in the order from above to below. For example, the image supply unit 101 supplies the pixel data of a pixel group 3200 of 3 pixels×3 pixels to the image processing unit 110, and the image processing unit 110 obtains a processing result for the processing target pixel (L3:P8). Next, the image supply unit 101 supplies the pixel data of a pixel group 3201 to the image processing unit 110, and the image processing unit 110 obtains a processing result for the processing target pixel (L4:P8). In addition, after the pixel data of a pixel group like a pixel group 3202 corresponding to a processing target pixel at the lower end of the processing target region is supplied, the image supply unit 101 supplies the pixel data of a pixel group 3203 corresponding to a processing target pixel located at the upper end of a column on the right side of the processing target pixel. Note that a pixel group corresponding to a processing target pixel located at the upper or lower end of the processing target region, like the pixel group 3202 or the pixel group 3203, includes pixels outside the processing target region. As the pixel data outside the processing target region, a predetermined value may be used, or the pixel data of a specific data train may be used.

Figure 17B:
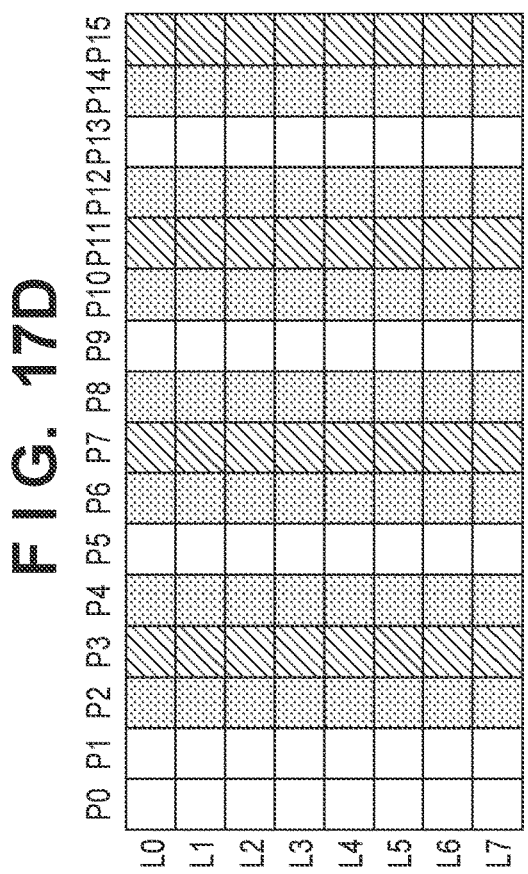
Figure 17C:
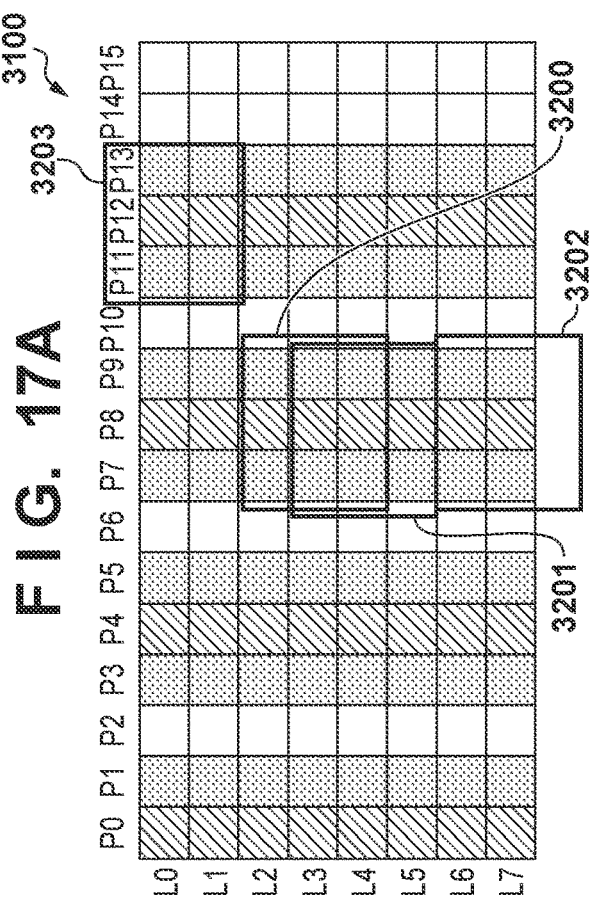
Figure 17D:
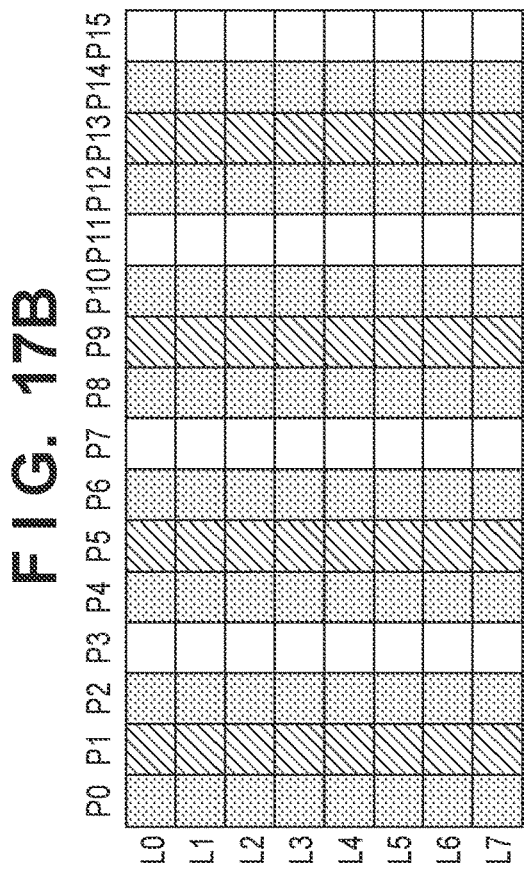

FIGS. 17B to 17D show pixel groups whose pixel data are supplied to the image processing units 111 to 113, like FIG. 17A.

The image supply unit 101 first starts supplying pixel data to the image processing unit 110 and starts supplying pixel data in the order of image processing units 111, 112, and 113 so processing target pixels to be processed by the image processing units do not exist in the same data train. An example of parallel processing performed in a case in which pixel data are supplied to the image processing units 110 to 113 while shifting the supply timing by one pixel will be described with reference to FIG. 18.

Figure 18:
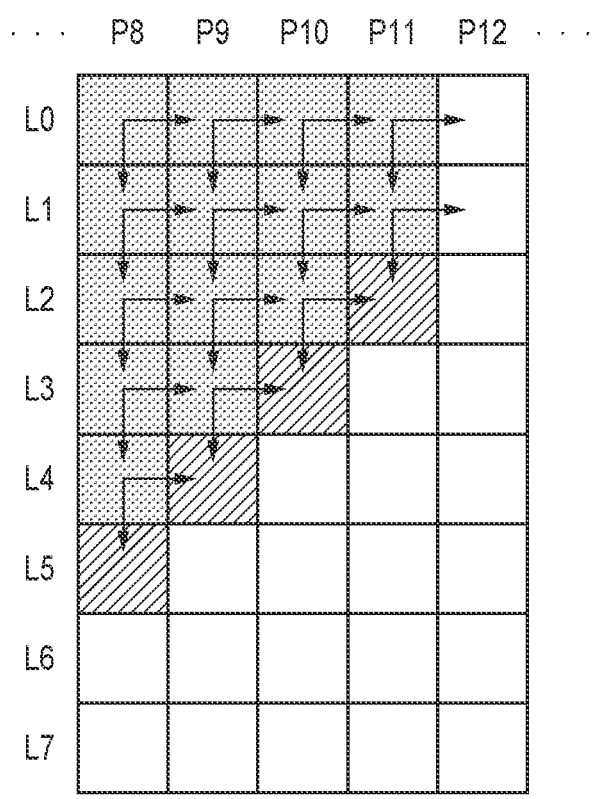
FIG. 18 is a view for explaining image processing according to the third embodiment.

FIG. 18 shows the portion of the pixel numbers P8 to P12 of the processing target region 3100. Referring to FIG. 18, pixels represented by halftone dots are processed pixels, and pixels represented by hatching are processing target pixels. According to the above-described method, the processing target pixels (L5:P8), (L4:P9), (L3:P10), and (L2:P11) are parallelly processed by the image processing units 110, 111, 112, and 113.

The arrows in FIG. 18 indicate the reference relationship of vertical line detection results and horizontal line detection results. For example, the image processing unit 111 processes the processing target pixel (L4:P9) by referring to the processing results of the pixels (L4:P8) and (L3:P9). In addition, for example, the image processing unit 110 processes the pixel (L7:P8) at the lower end of the processing target region and then processes the pixel (L0:P12). In this case, the image processing unit 110 performs the processing by referring to the processing result of the pixel (L0:P11). The processing result to be referred to may be acquired by the image processing unit 110 from the image processing unit 113 that has processed the pixel (L0:P11), or may be held by the image processing unit 113 and transferred to the image processing unit 110 at a desired timing.

In this embodiment, the pixel reference relationship in the vertical direction is determined by the order of processing target pixels to be processed by the image processing units. Additionally, as for the pixel reference relationship in the horizontal direction, a processing result to be referred to is transferred to another image processing unit, thereby referring to the processing result of an adjacent pixel. Furthermore, when the image processing units 110 to 113 process processing target pixels located on different data trains, the time to transfer the processing results is ensured. In this embodiment, the supply timing of the pixel data of pixels located on the same data train is shifted by one cycle for each image processing unit. However, the data supply method is not limited as long as the pixels to be simultaneously processed are located on different data trains.

With the above-described processing, it is possible to parallelly execute processing of accurately detecting vertical lines and horizontal lines using feedback. In this embodiment as well, parallel processing can be performed for a processing target region having an arbitrary height M (M: natural number) and an arbitrary width without any influence of the size of the processing target region, as in the first embodiment.

Fourth Embodiment

A data processing apparatus according to an embodiment of the present invention can perform parallel processing for a time-serially input data group such as voice data, video data, or various kinds of sensor data. A data processing apparatus that performs processing for a sequentially input data group using a recurrent neural network will be described below. A data processing apparatus according to the fourth embodiment is a data processing apparatus configured to perform machine translation by recognizing voice data in real time, which is an example of the data processing apparatus using a recurrent neural network.

Figure 21:
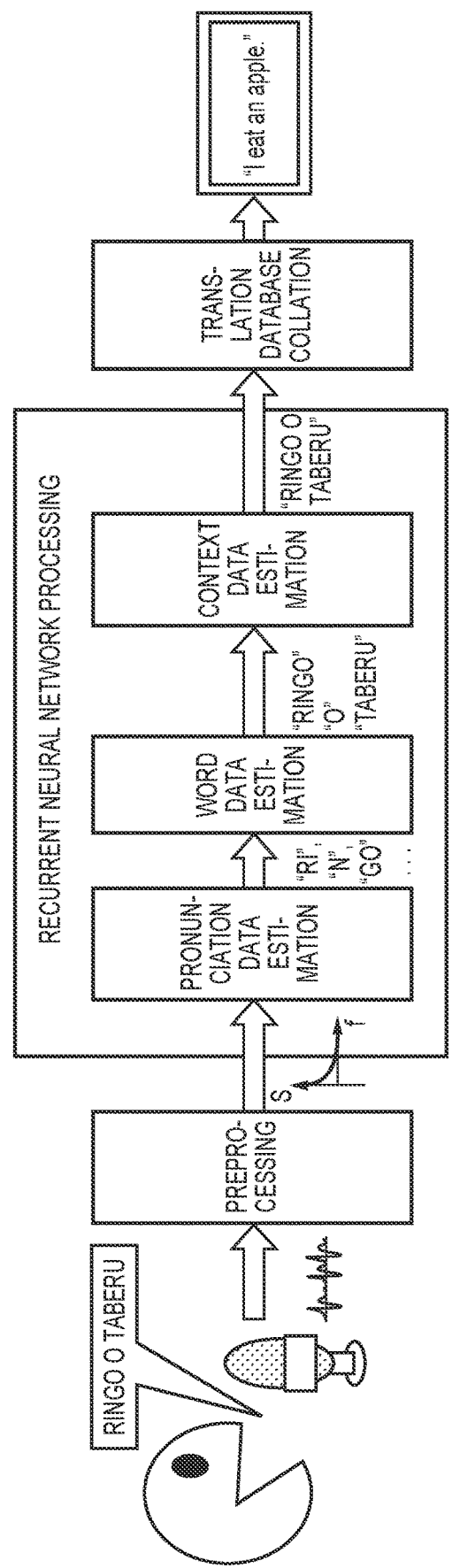
FIG. 21 is a conceptual view of a real-time machine translation system according to the fourth embodiment.

FIG. 21 is a conceptual view of real-time machine translation of voice data using a recurrent neural network. In this embodiment, a data group sequentially input to the recurrent neural network is the frequency data of a time-series voice. When preprocessing such as Fourier transformation is performed for time-series voice data, frequency data easy to analyze in processing of the subsequent stage can be obtained. However, the data input to the recurrent neural network is not limited to frequency data. The data processing apparatus according to this embodiment may include a processing unit configured to perform such preprocessing.

The data processing apparatus according to this embodiment performs inference processing of estimating context data corresponding to a voice based on frequency data. More specifically, when frequency data is input to the recurrent neural network, context data is output by an operation using a learned parameter. The context data is data representing contents of a voice and may be data representing, for example, the relationship between words. When the thus estimated context data is collated with a translation database, a machine translation result corresponding to the voice is obtained. The translation database may be, for example, a database that gives a text in the second language corresponding to context data in the first language, or may be a database that gives a word in the second language corresponding to a word in the first language. The data processing apparatus according to this embodiment may include a processing unit configured to perform such machine translation processing.

Figure 22:
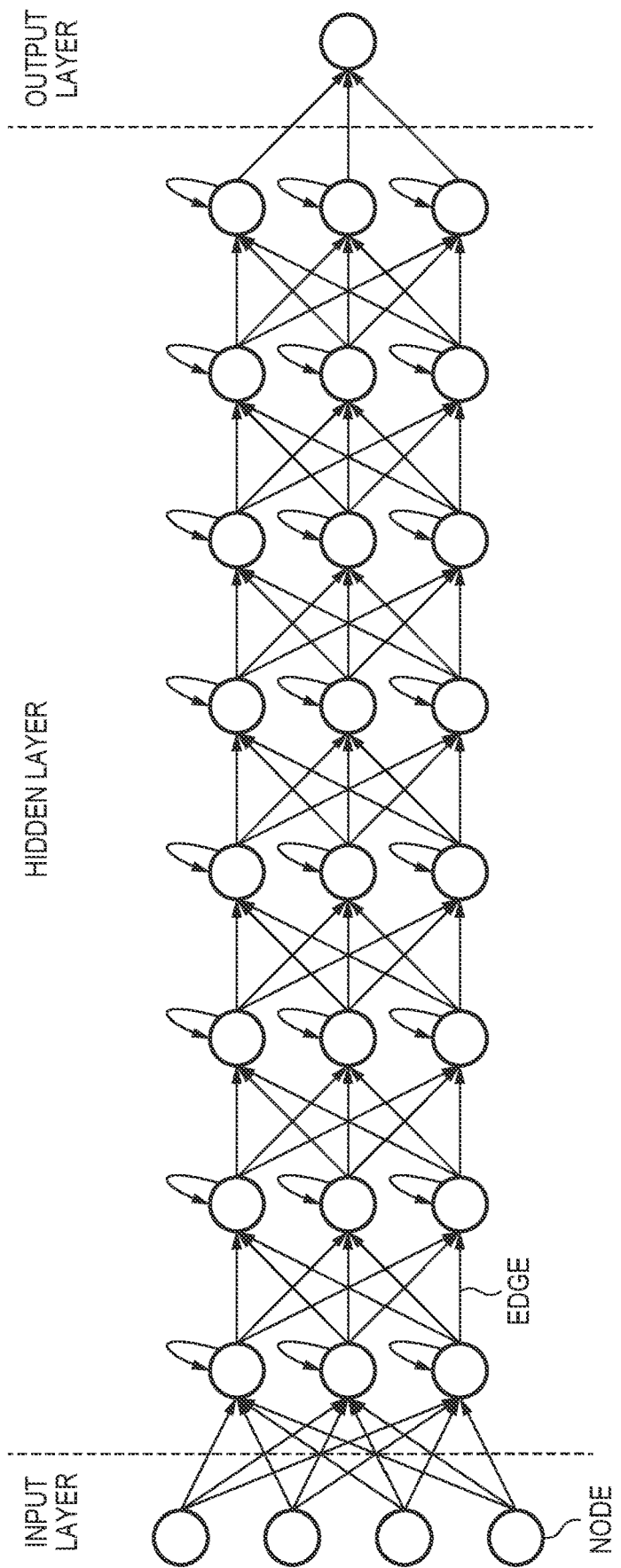
FIG. 22 is a view showing an example of the arrangement of a recurrent neural network.

FIG. 22 shows an example of the recurrent neural network. The recurrent neural network is a neural network which includes an input layer, an output layer, and hidden layers of multiple stages, and in which the nodes (states) of the layers are connected by edges. Here, the edge of a hidden layer is recursively connected to the node of the same layer. In other words, in a hidden layer, an operation is performed using data (intermediate data) generated in the same layer in addition to the output result from the preceding layer. For example, each hidden layer can perform an operation for the next data using intermediate data obtained by an operation for certain data. The operation in each node and the weight of each edge are represented by parameters. The parameters are determined in advance by learning using a solution expected to be obtained by the recurrent neural network.

It is said that in such a recurrent neural network, each layer recursively uses time-serially input data, thereby performing estimation stepwise from estimation of lower order to estimation of higher order. In this embodiment, it is considered that stepwise estimation is performed by estimating pronunciation data such as alphabets or Japanese syllabary from voice data, estimating word data from the pronunciation data, and estimating context data from the word data. For example, in the example shown in FIG. 21, from Japanese voice data "ringootaberu", syllable-based pronunciation data "ri", "n", "go", "o", "ta", "be", and "ru" and word-based word data "ringo" "o" "taberu" are sequentially obtained. Then, context data representing contents "ringootaberu/I eat an apple" is obtained from the word data, and an English text "I eat an apple" representing the meaning of the context data in English is obtained.

In general, the estimation accuracy is said to become high as the number of stages of hidden layers increases. However, to perform real-time processing, the processing time is limited. For this reason, the suitable number of stages of hidden layers may change depending on the language to be pronounced, or the like. In particular, when the number of stages of hidden layers is variable, and the length of input voice data is also variable, it is difficult to perform parallel processing in the recurrent neural network including a feedback loop. The data processing apparatus according to this embodiment can parallelize the processing using the recurrent neural network and shorten the processing time.

(Arrangement of Data Processing Apparatus)

Figure 23:
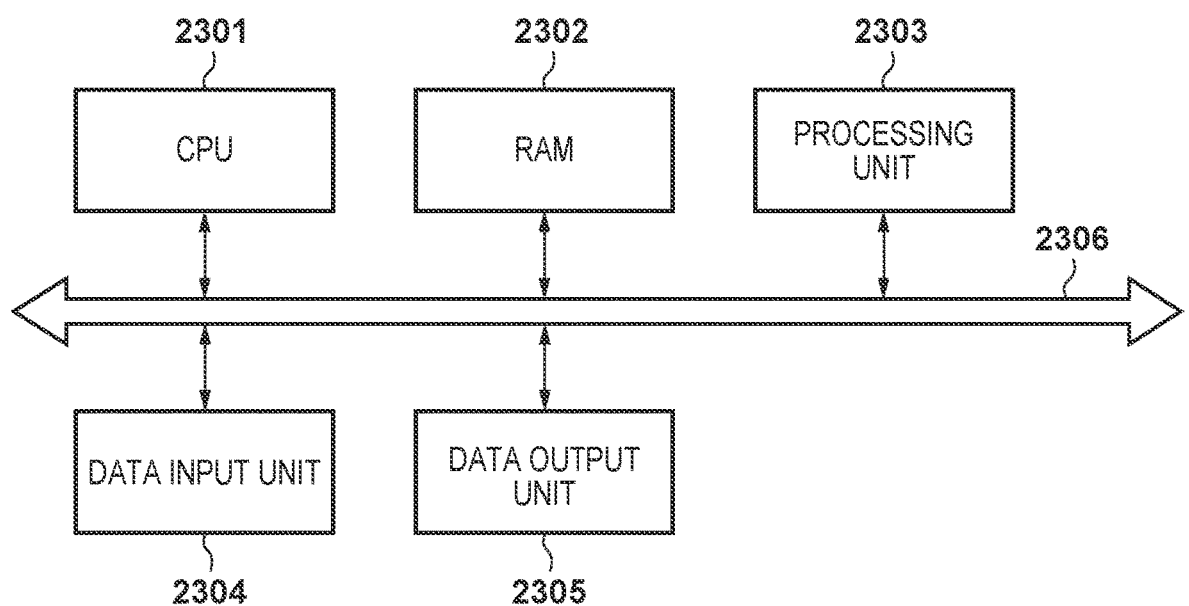
FIG. 23 is a block diagram showing an example of the arrangement of a data processing apparatus according to the fourth embodiment.

FIG. 23 shows the arrangement of the data processing apparatus according to this embodiment. The data processing apparatus according to this embodiment includes a processor such as a CPU 2301, a memory such as a RAM 2302, a processing unit 2303, a data input unit 2304, a data output unit 2305, and a bus 2306. The CPU 2301 controls the operation of the entire data processing apparatus using a computer program stored in the memory such as the RAM 2302. In addition, the CPU 2301 can perform at least some processes of machine translation.

The RAM 2302 stores the computer program to be used by the CPU 2301. In addition, the RAM 2302 can provide a storage area used to store input/output data and temporary data generated during processing. The processing unit 2303 is a processing unit configured to perform processing using the recurrent neural network, and estimates context data using voice data obtained by performing preprocessing by the CPU 2301. The data input unit 2304 can acquire data to the data processing apparatus, and may include, for example, a microphone used to input voice data to the data processing apparatus and an input device used by the user to input an instruction to the data processing apparatus. The data output unit 2305 can output data from the data processing apparatus to the outside, and may include, for example, a display device configured to present a translation result. The above-described units are connected via the bus 2306.

(Arrangement of Processing Unit 2303)

Figure 24:
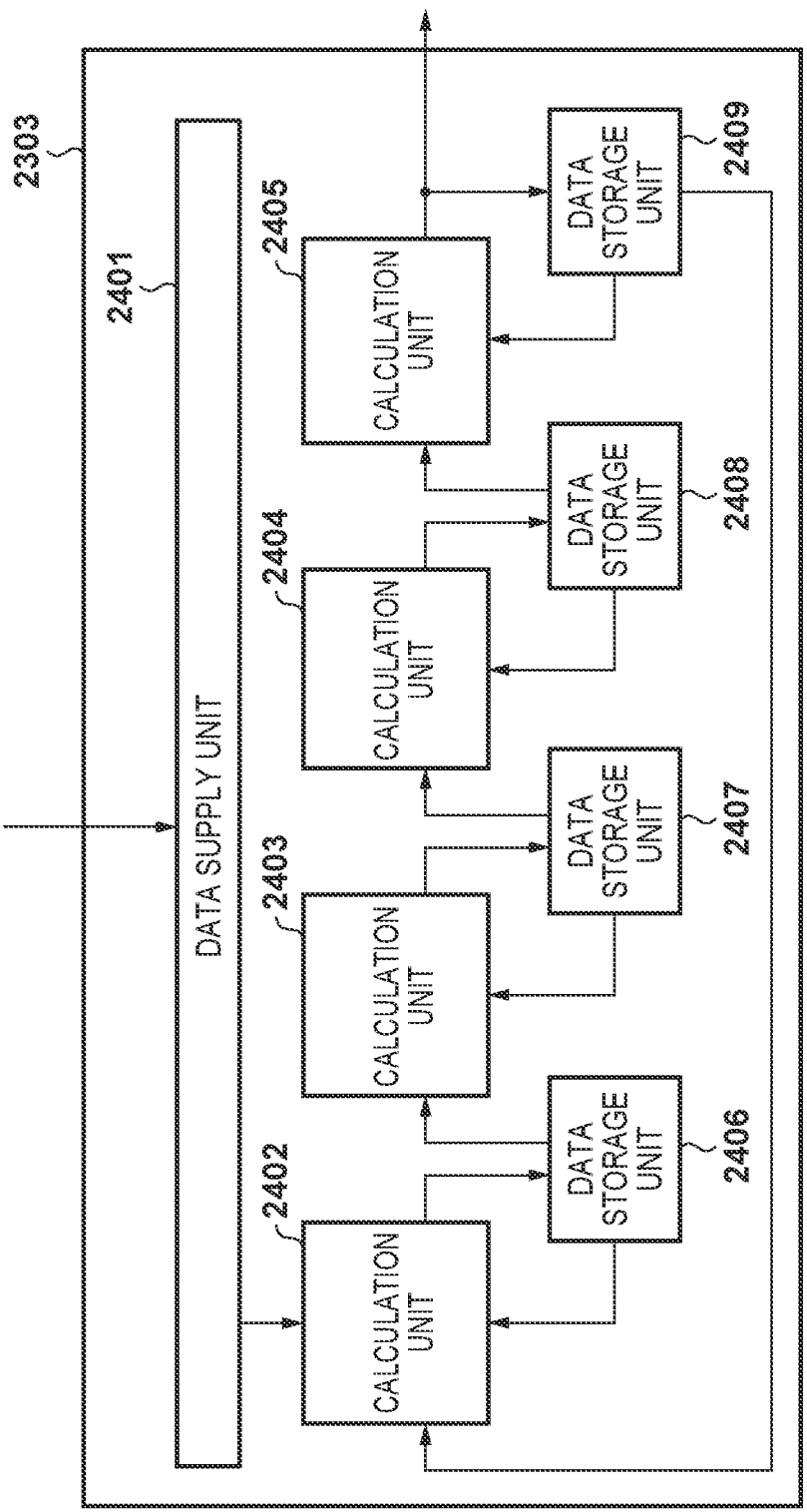
FIG. 24 is a block diagram showing an example of the arrangement of a processing unit according to the fourth embodiment.

FIG. 24 shows an example of the arrangement of the processing unit 2303. The processing unit 2303 according to this embodiment includes a data supply unit 2401, calculation units 2402, 2403, 2404, and 2405, and data storage units 2406 2407, 2408, and 2409.

The data supply unit 2401 supplies preprocessed voice data to the calculation unit 2402 at a desired timing. The calculation units 2402 to 2405 perform operations corresponding to the hidden layers that form the recurrent neural network. For example, each of the calculation units 2402 to 2405 can perform the operation of a hidden layer of the recurrent neural network and weighting for an input edge. By such an operation, each of the calculation units 2402 to 2405 repetitively generates the output result of the hidden layer and intermediate data to be recursively referred to. One calculation unit performs a plurality of times of calculation processing during the time in which processing using the recurrent neural network is performed. In addition, one calculation unit can perform calculation processing for each of the plurality of hidden layers. That is, each hidden layer calculation unit can perform weighting and operation for an edge using parameters for a corresponding hidden layer.

The data storage units 2406 to 2409 store output data from the calculation units. The output data is propagated to the next calculation unit at a desired timing. In addition, the data storage units 2406 to 2409 can store the intermediate data obtained at different times of calculation processing, which are used for the operations of the hidden layers. The intermediate data are also provided to the calculation units at a desired timing.

(Explanation of Operation)

In the first step, the data input unit 2304 acquires voice data via a microphone or the like. In the next step, the CPU 2301 performs preprocessing for the voice data. The preprocessing is not particularly limited, and may be, for example, reduction processing of noise included in the voice data or frequency conversion processing by Fourier transformation. The purpose of the preprocessing is to process the voice data to raise the estimation accuracy of context data.

Figure 25A:
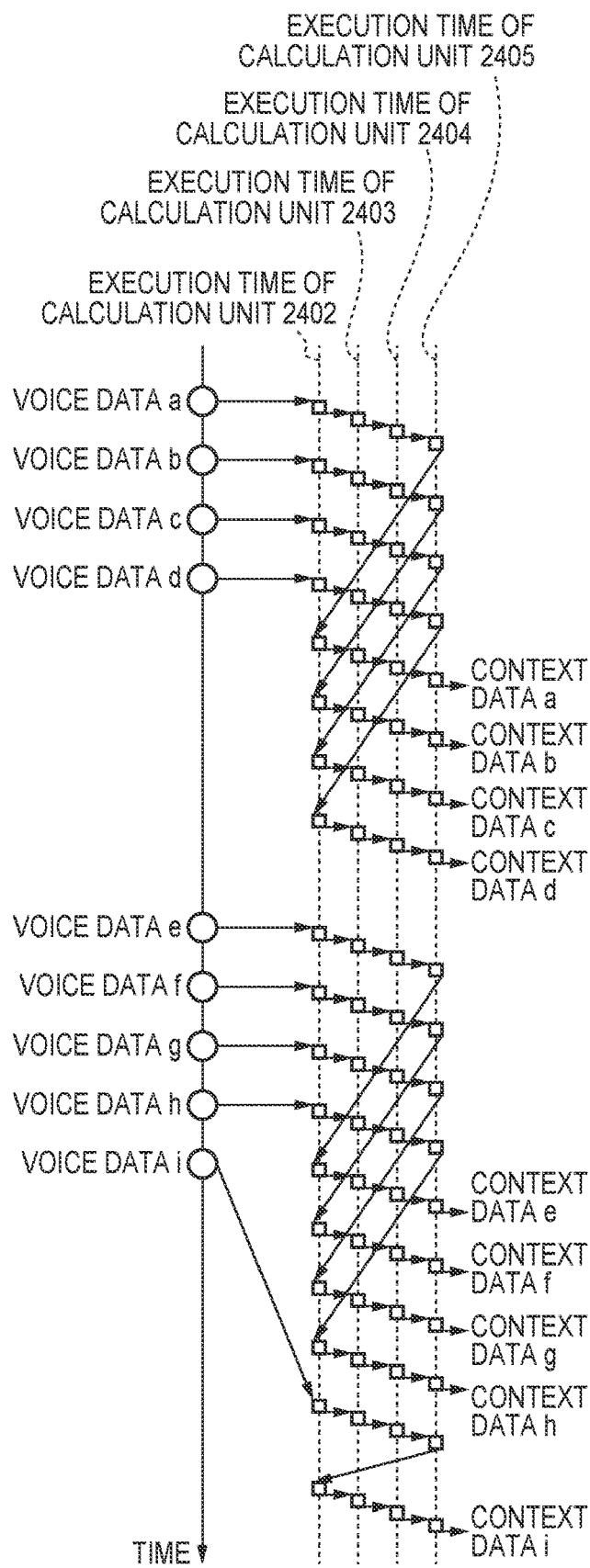
FIGS. 25A and 25B are views for explaining a data processing operation according to the fourth embodiment.
Figure 25B:
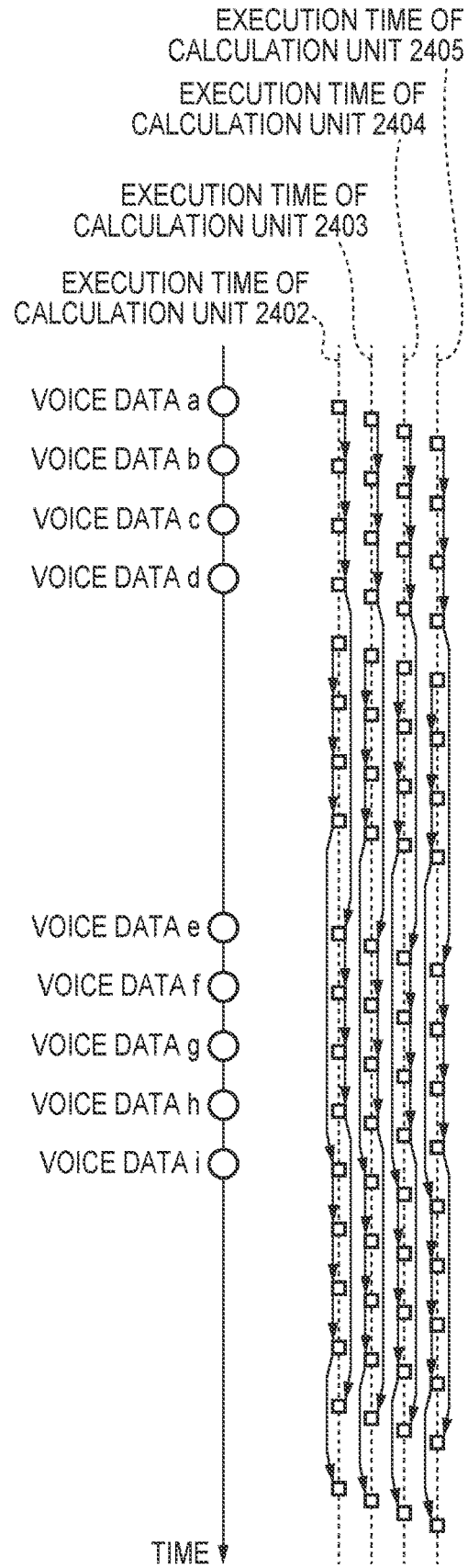

In the next step, the processing unit 2303 estimates context data using the preprocessed voice data. FIGS. 25A and 25B are views for explaining the procedure of processing of estimating context data from voice data. FIGS. 25A and 25B show an example in which the processing unit 2303 capable of performing processing in which the number of parallel processes is four performs processing using the recurrent neural network including eight stages of hidden layers.

In FIGS. 25A and 25B, preprocessed voice data are arranged in time series in accordance with input times, and the processing times of the calculation units for the voice data are mapped. As shown in FIGS. 25A and 25B, voice data a to i are sequentially input as a data group to the data processing apparatus according to this embodiment. In FIG. 25A, the flows of data passing through the calculation units until context data is obtained from the voice data are indicated by arrows. In FIG. 25B, the flows of intermediate data generated by the calculation units and recursively referred to are indicated by arrows.

In this embodiment, one calculation unit of the plurality of calculation units performs an operation corresponding to a hidden layer and transfers the output result of the hidden layer generated by the operation to a different calculation unit. For example, when processing for the voice data a in the first layer by the calculation unit 2402 is completed, output data to be used in the next layer is immediately transferred to the calculation unit 2403 via the data storage unit 2406. In addition, when processing in the second layer by the calculation unit 2403 is completed, output data is transferred to the calculation unit 2404 via the data storage unit 2407. When processing of the fourth layer by the calculation unit 2405 is thus completed, output data is stored in the data storage unit 2409. This output data is used by the calculation unit 2402 for the operation of the hidden layer using different parameters. In the example shown in FIGS. 25A and 25B, however, since the voice data b is input, and processing of the voice data starts, the output data waits in the data storage unit 2409.

For the voice data b as well, processing of the first to fourth layers by the calculation units 2402 to 2405 is performed, like the voice data a, and output data is stored in the data storage unit 2409. Similarly, processing by the calculation units 2402 to 2405 is performed for the voice data c and d as well. Here, the number of voice data under processing matches the number of hidden layer calculation units, that is, four in this embodiment. In this case, processing of the fifth layer by calculation unit 2402 using the output data of the calculation unit 2405 for the voice data a, which is stored in the data storage unit 2409, and parameters different from those in the first processing is executed. Furthermore, the calculation units 2403 to 2405 perform processing of the sixth to eighth layers using parameters different from those in the first processing, and estimated context data a corresponding to the voice data a is output.

On the other hand, the number (length) of voice data to be input is indefinite. Hence, voice data in a number larger than the number of calculation units may continuously be input. For example, as shown in FIG. 25A, five voice data e to i may continuously be input. In this case, when the voice data h is input, the number of voice data under processing reaches the number of calculation units, that is, four. In this case, processing for the voice data e in the fifth layer by the calculation unit 2402 can be executed immediately. On the other hand, in the example shown in FIG. 25A, the subsequently input voice data i is stored in the data supply unit 2401, and processing for the voice data i is performed when the processing of the voice data e to h is completed. The number of voice data to be stored in the data supply unit 2401 can be determined based on the processing performance of the calculation units and the time resolution of voice data to be input. Additionally, in the example shown in FIG. 25A, when processing for the voice data i in the fourth layer by the calculation unit 2405 is completed, and output data is output to the data storage unit 2409, input of next voice data is absent. In this case, processing of the voice data i using parameters different from those in the first processing by the calculation unit 2402 can immediately be performed.

As described above, in this embodiment, until the number of data groups under the processing by the data processing apparatus reaches the number of parallel processes (the number of calculation units), when new data is input, the calculation unit starts processing for the data in the first layer. On the other hand, when the number of data groups under the processing by the data processing apparatus reaches the number of parallel processes (the number of calculation units), processing of new data is not started, and the calculation unit performs processing of each layer for the data group already under processing. In this case, after the processing for the data group already under processing is completed, processing of new data can be started. According to this arrangement, it is possible to shorten the latency from the input of data until the output from the neural network is obtained while increasing the time to perform parallel processing and shortening the processing time.

In addition, one calculation unit of the plurality of calculation units performs an operation corresponding to a hidden layer while recursively referring to intermediate data for the same hidden layer. That is, as the processing from voice data input to context data estimation progresses in this way, intermediate data generated by the calculation unit and recursively referred to is also transferred from the data storage unit to the calculation unit in accordance with a processing timing. For example, intermediate data generated by the calculation unit 2402 at the time of processing of the voice data a is referred to when the calculation unit 2402 processes the subsequently input voice data b. Similarly, intermediate data generated by the calculation unit 2402 at the time of processing of the voice data d is referred to when the calculation unit 2402 processes the subsequently input voice data e. These reference timings are determined in accordance with the positions of the hidden layers that form the recurrent neural network. For example, the first processing (processing in the first layer) for the voice data d by the calculation unit 2402 and the second processing (processing in the fifth layer) for the voice data a correspond to operations in different hidden layers of the recurrent neural network. Hence, the second processing for the voice data a by the calculation unit 2402 is performed immediately after the first processing for the voice data d, but intermediate data generated at the time of processing for the voice data d is not referred to.

Each calculation unit thus performs an operation corresponding to a hidden layer while recursively referring to intermediate data for the same hidden layer, and transfers the output result of the hidden layer generated by the operation to a different calculation unit. In this way, the plurality of calculation units provided in the processing unit 2303 can perform processing for the data group using the recurrent neural network. Note that an operation may be performed in the input layer or output layer of the recurrent neural network. Such an operation may be performed by the CPU 2301 or may be performed by the calculation units 2402 to 2405 without referring to intermediate data.

In the next step, the CPU 2301 collates the estimated context data with the translation database, thereby generating a translated word. The data output unit 2305 can output the thus generated translated word. In this embodiment, as the output results for the time-serially input voice data as shown in FIG. 25A, context data a, b, c, d, and the like are sequentially obtained in real time. When the output results are used in combination, the CPU 2301 can generate a translated word while gradually raising the translation accuracy. Upon determining that continuously obtained context data represent different meanings, the CPU 2301 can instruct the data output unit 2305 to output the translated word such that its difference from preceding translated words can be seen.

As described above, according to this embodiment, processing can be speeded up by performing, for an arbitrary number of data groups, parallel processing by the processing unit configured to perform processing using the recurrent neural network. In addition, the number of stages of hidden layers of the recurrent neural network can be variable. In this case as well, parallel processing can be used by changing the number of times to process the same data group by one calculation unit. Note that the arrangement of the recurrent neural network is not limited to that described in this embodiment. For example, the data processing apparatus according to this embodiment can perform processing using a neural network configured to recursively use the output result of a node. Alternatively, the data processing apparatus according to this embodiment may perform processing using a neural network called LSTM (Long Short Term Memory) including a storage cell in each node and configured to recursively use the output result of a node.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2018-056750, filed Mar. 23, 2018, and No. 2019-009773, filed Jan. 23, 2019, which are hereby incorporated by reference herein in their entirety.

What is claimed is:

1. An image processing apparatus for performing image processing for an input image, comprising at least one circuit configured to function as:

N processing units each configured to refer to a processing result for a reference pixel different from a processing target pixel and generate a processing result for the processing target pixel, wherein the N processing units parallelly generate processing results for processing target pixels different from each other, the N processing units are connected to transfer the processing results, processing results for each of N continuous pixels included in a first pixel line of a processing target region in the input image are sequentially generated in a predetermined order by different processing units, and each of the N processing units is further configured to generate a processing result for a first pixel included in the first pixel line and next generate a processing result for a second pixel, wherein the second pixel is included in a second pixel line different from the first pixel line in the processing target region and becomes processable in accordance with the generation of the processing result for the first pixel.

2. The apparatus according to claim 1, wherein the at least one circuit is further configured to function as a supply unit configured to supply, to the N processing units, pixel data necessary for processing of the processing target pixel at a timing to perform the processing.

3. The apparatus according to claim 2, wherein the supply unit is further configured to sequentially supply pixel data of N continuous processing target pixels included in the first pixel line respectively to the N processing units in the predetermined order, and to supply pixel data of the second pixel to a processing units that has completed processing for the first pixel.

4. The apparatus according to claim 2, wherein
the processing target region includes M pixel lines, and
the supply unit is further configured to supply pixel data to one of the processing units sequentially in an order from a processing target pixel in the first pixel line to a processing target pixel in an Mth pixel line, and then supply pixel data of a processing target pixel in the first pixel line.

5. The apparatus according to claim 1, wherein the N processing units have the same arrangement.

6. The apparatus according to claim 1, wherein the apparatus has
a first operation mode in which the N processing units parallelly perform image processing for one color of the input image, and
a second operation mode in which a first group of the N processing units parallelly performs image processing for a first color of the input image, and a second group of the N processing units parallelly performs image processing for a second color of the input image.

7. The apparatus according to claim 1, wherein the at least one circuit is further configured to function as a path control unit configured to control connection between the N processing units such that the processing units included in each group are connected to transfer the processing results,
wherein the N processing units are classified into L groups in accordance with the number L of colors of the input image.

8. The apparatus according to claim 1, wherein the processing target region includes M (M>N) pixel lines, and the N processing units start processing of an Mth pixel line before processing of the first pixel line completes.

9. The apparatus according to claim 1, wherein the processing results for the N continuous pixels included in the first pixel line are generated by the different processing units in the predetermined order in continuous processing cycles.

10. The apparatus according to claim 1, wherein a first processing units acquires a processing result for one of a plurality of reference pixels from a memory of the first processing units, which stores the processing result of the first processing units, and acquires a processing result for another one of the plurality of reference pixels from a second processing units different from the first processing units.

11. The apparatus according to claim 1, wherein relative positions of the first pixel and the second pixel are the same regardless of a position of the first pixel.

12. The apparatus according to claim 11, wherein the position of the first pixel is on an ith row and jth column, a position of the second pixel is on an (i+1) Th row and (j−a) Th column, where a is an arbitrary integer determined by the position of the reference pixel.

13. The apparatus according to claim 1, wherein the reference pixel is located in a pixel line on an upper side of the processing target pixel or located in the same pixel line as that of the processing target pixel on a left side of the processing target pixel.

14. An image processing apparatus for performing image processing for an input image, comprising:

N processing circuits each configured to refer to a processing result for a reference pixel different from a processing target pixel and generate a processing result for the processing target pixel, wherein the N processing circuits parallelly generate processing results for processing target pixels different from each other, the N processing circuits are connected to transfer the processing results, and each of the N processing circuits acquires the processing result for the reference pixel from a physically different processing circuit in the N processing circuits, wherein each of the N processing circuits acquires the processing result for the reference pixel from the same processing circuit regardless of the processing target pixel.

15. An image processing method for performing image processing for an input image, comprising:

parallelly generating processing results for processing target pixels different from each other by N processing modules, wherein each of the N processing modules is configured to refer to a processing result for a reference pixel different from the processing target pixel and generate the processing result for the processing target pixel, and wherein the N processing modules are connected to transfer the processing results, wherein processing results for each of N continuous pixels included in a first pixel line of a processing target region in the input image are sequentially generated in a predetermined order by the different processing module, and each of the N processing modules generates a processing result for a first pixel included in the first pixel line and next generates a processing result for a second pixel, wherein the second pixel is included in a second pixel line different from the first pixel line in the processing target region and becomes processable in accordance with the generation of the processing result for the first pixel.

* * * * *